(12) United States Patent
Swigart et al.

(10) Patent No.: US 7,434,339 B2
(45) Date of Patent: *Oct. 14, 2008

(54) FOOTWEAR WITH A SOLE STRUCTURE INCORPORATING A LOBED FLUID-FILLED CHAMBER

(75) Inventors: John F. Swigart, Portland, OR (US); Eric Steven Schindler, Portland, OR (US)

(73) Assignee: Nike, Inc., Beaverton, OR (US)

( * ) Notice: Subject to any disclaimer, the term of this patent is extended or adjusted under 35 U.S.C. 154(b) by 437 days.

This patent is subject to a terminal disclaimer.

(21) Appl. No.: 11/274,697

(22) Filed: Nov. 15, 2005

(65) Prior Publication Data

US 2006/0064901 A1    Mar. 30, 2006

Related U.S. Application Data

(63) Continuation of application No. 10/620,843, filed on Jul. 16, 2003, now Pat. No. 7,128,796.

(51) Int. Cl.
*A43B 13/20* (2006.01)
(52) U.S. Cl. .......................................... 36/29; 36/35 B
(58) Field of Classification Search .................. 36/28, 36/29, 35 R, 35 B
See application file for complete search history.

(56) References Cited

U.S. PATENT DOCUMENTS

| 900,867 A | 10/1908 | Miller |
|---|---|---|
| 1,069,001 A | 7/1913 | Guy |
| 1,240,153 A | 9/1917 | Olsen |
| 1,304,915 A | 5/1919 | Spinney |
| 1,323,610 A | 12/1919 | Price |
| 1,514,468 A | 11/1924 | Schopf |
| 1,584,034 A | 5/1926 | Klotz |
| 1,625,582 A | 4/1927 | Anderson |
| 1,625,810 A | 4/1927 | Krichbaum |
| 1,869,257 A | 7/1932 | Hitzler |
| 1,916,483 A | 7/1933 | Krichbaum |

(Continued)

FOREIGN PATENT DOCUMENTS

AT    181938    2/1906

(Continued)

OTHER PUBLICATIONS

Util. Model 54221, Jun. 1978, ROC.

(Continued)

*Primary Examiner*—Marie Patterson
(74) *Attorney, Agent, or Firm*—Plumsea Law Group, LLC

(57) ABSTRACT

A fluid-filled chamber for an article of footwear and a method for manufacturing the chamber are disclosed. The chamber may be incorporated into a sole structure of the footwear and includes a central area and a plurality of lobes extending outward from the central area. The lobes are in fluid communication with the central area and are formed from a first surface, a second surface, and a sidewall. The sidewall joins with the first surface with the second surface to seal the fluid within the chamber, but no internal connections are generally utilized to join interior portions of the first surface with interior portions of the second surface. The fluid within the chamber may be air at a pressure that is approximately equal to an ambient pressure.

26 Claims, 22 Drawing Sheets

U.S. PATENT DOCUMENTS

| | | | |
|---|---|---|---|
| 1,970,803 | A | 8/1934 | Johnson |
| 2,004,906 | A | 6/1935 | Simister |
| 2,080,469 | A | 5/1937 | Gilbert |
| 2,086,389 | A | 7/1937 | Pearson |
| 2,269,342 | A | 1/1942 | Johnson |
| 2,365,807 | A | 12/1944 | Dialynas |
| 2,488,382 | A | 11/1949 | Davis |
| 2,546,827 | A | 3/1951 | Lavinthal |
| 2,600,239 | A | 6/1952 | Gilbert |
| 2,645,865 | A | 7/1953 | Town |
| 2,677,906 | A | 5/1954 | Reed |
| 2,703,770 | A | 3/1955 | Melzer |
| 2,748,401 | A | 6/1956 | Winstead |
| 2,762,134 | A | 9/1956 | Town |
| 3,030,640 | A | 4/1962 | Gosman |
| 3,048,514 | A | 8/1962 | Bentele et al. |
| 3,120,712 | A | 2/1964 | Menken |
| 3,121,430 | A | 2/1964 | O'Reilly |
| 3,204,678 | A | 9/1965 | Worcester |
| 3,251,076 | A | 5/1966 | Burke |
| 3,284,264 | A | 11/1966 | O'Rourke |
| 3,300,556 | A | 1/1967 | Battenfeld et al. |
| 3,335,045 | A | 8/1967 | Post |
| 3,366,525 | A | 1/1968 | Jackson |
| 3,469,576 | A | 9/1969 | Smith et al. |
| 3,568,227 | A | 3/1971 | Dunham |
| 3,589,037 | A | 6/1971 | Gallagher |
| 3,608,215 | A | 9/1971 | Fukuoka |
| 3,685,176 | A | 8/1972 | Rudy |
| 3,758,964 | A | 9/1973 | Nishimura |
| 3,765,422 | A | 10/1973 | Smith |
| 4,017,931 | A | 4/1977 | Golden |
| 4,054,960 | A | 10/1977 | Pettit et al. |
| 4,115,934 | A | 9/1978 | Hall |
| 4,129,951 | A | 12/1978 | Petrosky |
| 4,167,795 | A | 9/1979 | Lambert, Jr. |
| 4,183,156 | A | 1/1980 | Rudy |
| 4,187,620 | A | 2/1980 | Seiner |
| 4,217,705 | A | 8/1980 | Donzis |
| 4,219,945 | A | 9/1980 | Rudy |
| 4,271,606 | A | 6/1981 | Rudy |
| 4,287,250 | A | 9/1981 | Rudy |
| 4,292,702 | A | 10/1981 | Phillips |
| 4,297,797 | A | 11/1981 | Meyers |
| 4,305,212 | A | 12/1981 | Coomer |
| 4,328,599 | A | 5/1982 | Mollura |
| 4,340,626 | A | 7/1982 | Rudy |
| 4,358,902 | A | 11/1982 | Cole et al. |
| 4,423,000 | A | 12/1983 | Teraoka |
| 4,431,003 | A | 2/1984 | Sztancsik |
| 4,446,634 | A | 5/1984 | Johnson et al. |
| 4,458,430 | A | 7/1984 | Peterson |
| 4,483,030 | A | 11/1984 | Plick et al. |
| 4,486,964 | A | 12/1984 | Rudy |
| 4,506,460 | A | 3/1985 | Rudy |
| 4,547,919 | A | 10/1985 | Wang |
| 4,662,087 | A | 5/1987 | Beuch |
| 4,670,995 | A | 6/1987 | Huang |
| 4,686,130 | A | 8/1987 | Kon |
| 4,722,131 | A | 2/1988 | Huang |
| 4,744,157 | A | 5/1988 | Dubner |
| 4,779,359 | A | 10/1988 | Famolare, Jr. |
| 4,782,602 | A | 11/1988 | Lakic |
| 4,803,029 | A | 2/1989 | Iversen et al. |
| 4,817,304 | A | 4/1989 | Parker et al. |
| 4,823,482 | A | 4/1989 | Lakic |
| 4,829,682 | A | 5/1989 | Gasbarro |
| 4,845,338 | A | 7/1989 | Lakic |
| 4,845,861 | A | 7/1989 | Moumgdjian |
| 4,874,640 | A | 10/1989 | Donzis |
| 4,891,855 | A | 1/1990 | Cheng-Chung |
| 4,906,502 | A | 3/1990 | Rudy |
| 4,912,861 | A | 4/1990 | Huang |
| 4,936,029 | A | 6/1990 | Rudy |
| 4,965,899 | A | 10/1990 | Sekido et al. |
| 4,972,611 | A | 11/1990 | Swartz et al. |
| 4,991,317 | A | 2/1991 | Lakic |
| 4,999,931 | A | 3/1991 | Vermeulen |
| 4,999,932 | A | 3/1991 | Grim |
| 5,014,449 | A | 5/1991 | Richard et al. |
| 5,022,109 | A | 6/1991 | Pekar |
| 5,025,575 | A | 6/1991 | Lakic |
| 5,042,176 | A | 8/1991 | Rudy |
| 5,044,030 | A | 9/1991 | Balaton |
| 5,046,267 | A | 9/1991 | Kilgore et al. |
| 5,083,361 | A | 1/1992 | Rudy |
| 5,104,477 | A | 4/1992 | Williams et al. |
| 5,155,927 | A | 10/1992 | Bates et al. |
| 5,158,767 | A | 10/1992 | Cohen et al. |
| 5,179,792 | A | 1/1993 | Brantingham |
| 5,193,246 | A | 3/1993 | Huang |
| 5,199,191 | A | 4/1993 | Moumdjian |
| 5,224,277 | A | 7/1993 | Sang Do |
| 5,224,278 | A | 7/1993 | Jeon |
| 5,228,156 | A | 7/1993 | Wang |
| 5,235,715 | A | 8/1993 | Donzis |
| 5,238,231 | A | 8/1993 | Huang |
| 5,245,766 | A | 9/1993 | Warren |
| 5,253,435 | A | 10/1993 | Auger et al. |
| 5,257,470 | A | 11/1993 | Auger et al. |
| 5,297,349 | A | 3/1994 | Kilgore |
| 5,335,382 | A | 8/1994 | Huang |
| 5,337,492 | A | 8/1994 | Anderie et al. |
| 5,353,523 | A | 10/1994 | Kilgore et al. |
| 5,355,552 | A | 10/1994 | Huang |
| 5,367,791 | A | 11/1994 | Gross et al. |
| 5,406,719 | A | 4/1995 | Potter |
| 5,425,184 | A | 6/1995 | Lyden et al. |
| 5,543,194 | A | 8/1996 | Rudy |
| 5,558,395 | A | 9/1996 | Huang |
| 5,572,804 | A | 11/1996 | Skaja et al. |
| 5,595,004 | A | 1/1997 | Lyden et al. |
| 5,625,964 | A | 5/1997 | Lyden et al. |
| 5,669,161 | A | 9/1997 | Huang |
| 5,686,167 | A | 11/1997 | Rudy |
| 5,713,141 | A | 2/1998 | Mitchell et al. |
| 5,741,568 | A | 4/1998 | Rudy |
| 5,753,061 | A | 5/1998 | Rudy |
| 5,755,001 | A | 5/1998 | Potter et al. |
| 5,771,606 | A | 6/1998 | Litchfield et al. |
| 5,802,739 | A | 9/1998 | Potter et al. |
| 5,830,553 | A | 11/1998 | Huang |
| 5,832,630 | A | 11/1998 | Potter |
| 5,846,063 | A | 12/1998 | Lakic |
| 5,902,660 | A | 5/1999 | Huang |
| 5,907,911 | A | 6/1999 | Huang |
| 5,916,664 | A | 6/1999 | Rudy |
| 5,925,306 | A | 7/1999 | Huang |
| 5,937,462 | A | 8/1999 | Huang |
| 5,952,065 | A | 9/1999 | Mitchell et al. |
| 5,976,451 | A | 11/1999 | Skaja et al. |
| 5,979,078 | A | 11/1999 | McLaughlin |
| 5,987,780 | A | 11/1999 | Lyden et al. |
| 5,993,585 | A | 11/1999 | Goodwin et al. |
| 6,013,340 | A | 1/2000 | Bonk et al. |
| 6,027,683 | A | 2/2000 | Huang |
| 6,029,962 | A | 2/2000 | Shorten et al. |
| 6,055,746 | A | 5/2000 | Lyden et al. |
| 6,065,150 | A | 5/2000 | Huang |
| 6,082,025 | A | 7/2000 | Bonk et al. |
| 6,098,313 | A | 8/2000 | Skaja |
| 6,119,371 | A | 9/2000 | Goodwin et al. |
| 6,127,010 | A | 10/2000 | Rudy |
| 6,127,026 | A | 10/2000 | Bonk et al. |

| | | | | |
|---|---|---|---|---|
| 6,128,837 A | 10/2000 | Huang | FR 2404413 | 4/1979 |
| 6,203,868 B1 | 3/2001 | Bonk et al. | FR 2407008 | 5/1979 |
| 6,217,977 B1 | 4/2001 | Lin | FR 2483321 | 4/1981 |
| 6,253,466 B1 | 7/2001 | Harmon-Weiss et al. | FR 2614510 | 4/1987 |
| 6,266,897 B1 | 7/2001 | Seydel et al. | FR 2639537 | 11/1988 |
| 6,321,465 B1 | 11/2001 | Bonk et al. | GB 7441 | 0/1906 |
| 6,374,514 B1 | 4/2002 | Swigart | GB 14955 | 0/1893 |
| 6,457,262 B1 | 10/2002 | Swigart | GB 233387 | 1/1924 |
| 6,571,490 B2 | 6/2003 | Tawney et al. | GB 978654 | 12/1964 |
| 7,000,335 B2 * | 2/2006 | Swigart et al. ............ 36/29 | GB 1128764 | 10/1968 |
| 2003/0056400 A1 | 3/2003 | Potter et al. | JP 266718 | 9/1992 |
| 2003/0150132 A1 | 8/2003 | Lin | JP 6-181802 | 7/1994 |
| 2005/0011085 A1 | 1/2005 | Swigart et al. | WO WO89/10074 | 11/1989 |

FOREIGN PATENT DOCUMENTS

| | | |
|---|---|---|
| AT | 200963 | 12/1958 |
| CA | 727582 | 2/1966 |
| DE | 32 34 086 | 9/1982 |
| DE | G92 01 758.4 | 12/1992 |
| EP | 0 094 868 | 5/1983 |
| EP | 0 215 974 A1 | 9/1985 |
| EP | 0 605 485 B1 | 9/1992 |
| FR | 1195549 | 11/1959 |
| FR | 1406610 | 11/1965 |
| FR | 2144464 | 1/1973 |

| | | |
|---|---|---|
| WO | WO90/10396 | 9/1990 |
| WO | WO91/11928 | 8/1991 |
| WO | WO91/11931 | 8/1991 |
| WO | WO92/08384 | 5/1992 |
| WO | WO95/20332 | 8/1995 |

OTHER PUBLICATIONS

App. 75100322, Jan. 1975, ROC.
Sports Research Review, NIKE, Inc., Jan./Feb. 1990.
Brooks Running Catalog, Fall 1991.

* cited by examiner

FOOTWEAR WITH A SOLE STRUCTURE INCORPORATING A LOBED FLUID-FILLED CHAMBER

CROSS-REFERENCE To RELATED APPLICATION

This U.S. Patent Application is a continuation application of and claims priority to U.S. patent application Ser. No. 10/620,843, which was filed in the U.S. Patent and Trademark Office on Jul. 16, 2003 and entitled Footwear With A Sole Structure Incorporating A Lobed Fluid-Filled Chamber, such prior U.S. Patent Application being entirely incorporated herein by reference.

BACKGROUND OF THE INVENTION

1. Field of the Invention

The present invention relates to footwear The invention concerns, more particularly, a fluid-filled chamber suitable for footwear applications, wherein the chamber has a lobed structure.

2. Description of Background Art

A conventional article of footwear includes two primary elements, an upper and a sole structure. With respect to athletic footwear, for example, the upper generally includes multiple material layers, such as textiles, foam, and leather, that are stitched or adhesively bonded together to form a void on the interior of the footwear for securely and comfortably receiving a foot. The sole structure has a layered configuration that includes an insole, a midsole, and an outsole. The insole is a thin cushioning member positioned within the void and adjacent the foot to enhance footwear comfort. The midsole forms a middle layer of the sole structure and is often formed of a foam material, such as polyurethane or ethylvinylacetate. The outsole is secured to a lower surface of the midsole and provides a durable, wear-resistant surface for engaging the ground.

Midsoles formed of conventional foam materials compress resiliently under an applied load, thereby attenuating forces and absorbing energy associated with walking or running, for example. The resilient compression of the foam materials is due, in part, to the inclusion of cells within the foam structure that define an inner volume substantially displaced by gas. That is, the foam materials include a plurality of pockets that enclose air. After repeated compressions, however, the cell structures may begin to permanently collapse, which results in decreased compressibility of the foam. Accordingly, the overall ability of the midsole to attenuate forces and absorb energy deteriorates over the life of the midsole.

One manner of minimizing the effects of the cell structure collapse in conventional foam materials involves the use of a structure having the configuration of a fluid-filled chamber, as disclosed in U.S. Pat. No. 4,183,156 to Rudy, hereby incorporated by reference. The fluid-filled chamber has the structure of a bladder that includes an outer enclosing member formed of an elastomeric material that defines a plurality of tubular members extending longitudinally throughout the length of an article of footwear. The tubular members are in fluid communication with each other and jointly extend across the width of the footwear. U.S. Pat. No. 4,219,945 to Rudy, also incorporated by reference, discloses a similar fluid-filled chamber encapsulated in a foam material, wherein the combination of the fluid-filled chamber and the encapsulating foam material functions as a midsole.

U.S. Pat. No. 4,817,304 to Parker, et al., hereby incorporated by reference, discloses a foam-encapsulated, fluid-filled chamber in which apertures are formed in the foam and along side portions of the chamber. When the midsole is compressed, the chamber expands into the apertures. Accordingly, the apertures provide decreased stiffness during compression of the midsole, while reducing the overall weight of the footwear. Further, by appropriately locating the apertures in the foam material, the overall impact response characteristics may be adjusted in specific areas of the footwear.

The fluid-filled chambers described above may be manufactured by a two-film technique, wherein two separate layers of elastomeric film are formed to have the overall shape of the chamber. The layers are then welded together along their respective peripheries to form an upper surface, a lower surface, and sidewalls of the chamber, and the layers are welded together at predetermined interior locations to impart a desired configuration to the chamber. That is, interior portions of the layers are connected to form chambers of a predetermined shape and size at desired locations. The chambers are subsequently pressurized above ambient pressure by inserting a nozzle or needle, which is connected to a fluid pressure source, into a fill inlet formed in the chamber. After the chambers are pressurized, the nozzle is removed and the fill inlet is sealed, by welding for example.

Another manufacturing technique for manufacturing fluid-filled chambers of the type described above is through a blow-molding process, wherein a liquefied elastomeric material is placed in a mold having the desired overall shape and configuration of the chamber. The mold has an opening at one location through which pressurized air is provided. The pressurized air forces the liquefied elastomeric material against the inner surfaces of the mold and causes the material to harden in the mold, thereby forming the chamber to have the desired configuration.

Another type of chamber utilized in footwear midsoles is disclosed in U.S. Pat. Nos. 4,906,502 and 5,083,361, both to Rudy, and both hereby incorporated by reference. The chambers comprise a hermetically sealed outer barrier layer that is securely bonded over a double-walled fabric core. The double-walled fabric core has upper and lower outer fabric layers normally spaced apart from each another at a predetermined distance, and may be manufactured through a double needle bar Raschel knitting process. Connecting yarns, potentially in the form of multi-filament yarns with many individual fibers, extend internally between the facing surfaces of the fabric layers and are anchored to the fabric layers. The individual filaments of the connecting yarns form tensile restraining members that limit outward movement of the barrier layers to a desired distance.

U.S. Pat. Nos. 5,993,585 and 6,119,371, both issued to Goodwin et al., and both hereby incorporated by reference, also disclose chambers incorporating a double-walled fabric core, but without a peripheral seam located midway between the upper and lower surfaces of the chamber. Instead, the seam is located adjacent to the upper surface of the chamber. Advantages in this design include removal of the seam from the area of maximum sidewall flexing and increased visibility of the interior of the chamber, including the connecting yarns. The process used to manufacture a chamber of this type, involves the formation of a shell, which includes a lower surface and a sidewall, with a mold. The double-walled fabric core is placed on top of a covering layer, and the shell is placed over the covering layer and core. The assembled shell, covering layer, and core are then moved to a lamination station where radio frequency energy bonds opposite sides of the core to the shell and covering layer, and bonds a periphery of the shell to the covering layer. The chamber is then pressurized by inserting a fluid so as to place the connecting yarns in tension.

A process for thermoforming a chamber is disclosed in U.S. Pat. No. 5,976,451 to Skaja et al., hereby incorporated by reference, wherein a pair of flexible thermoplastic resin layers are heated and placed against a pair of molds, with a vacuum drawing the layers into the mold. The layers are then pressed together to form the chamber.

The material forming outer layers of the chambers discussed above may be formed of a polymer material, such as a thermoplastic elastomer, that is substantially impermeable to the fluid within the chamber. More specifically, one suitable material is a film formed of alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Another suitable material is a flexible microlayer membrane that includes alternating layers of a gas barrier material and an elastomeric material, as disclosed in U.S. Pat. Nos. 6,082,025 and 6,127,026 to Bonk et al., both hereby incorporated by reference. Other suitable thermoplastic elastomer materials or films include polyurethane, polyester, polyester polyurethane, polyether polyurethane, such as cast or extruded ester-based polyurethane film. Additional suitable materials are disclosed in the '156 and '945 patents to Rudy, which were discussed above. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

The fluid contained within the chamber may include any of the gasses disclosed in U.S. Pat. No. 4,340,626 to Rudy, such as hexafluoroethane and sulfur hexafluoride, for example. In addition, some chambers enclose pressurized nitrogen gas or air.

SUMMARY OF THE INVENTION

The present invention is a chamber for an article of footwear that includes a first surface, an opposite second surface, and a sidewall extending between edges of the first surface and the second surface. The sidewall is joined with the first surface and the second surface such that no internal connections secure interior portions of the first surface to interior portions of the second surface. A fluid is sealed within the chamber at a pressure between an ambient pressure and five pounds per square inch of the ambient pressure. Furthermore, a plurality of lobes extend outward from a central area of the chamber. The lobes are defined by the first surface, second surface, and sidewall, and the lobes are in fluid communication with the central area.

The first surface and the second surface may have a planar configuration. Alternately, one of the surfaces may be curved. In addition, portions of the sidewall positioned between the lobes may have a sloped configuration, and the portions of the sidewall adjacent distal ends of the lobes may have a substantially vertical slope.

The lobes may be configured to extend radially outward from the central area. Accordingly, the lobes may extend outward in different directions from the periphery of the central area. The number of lobes may vary significantly within the scope of the invention. The lobes define spaces located between adjacent lobes. When incorporated into an article of footwear, the chamber will be at least partially encapsulated within a polymer foam material. Accordingly, the polymer foam will extend between the lobes to form columns. In general, the surface of the columns will contact the sidewall and have the shape of the spaces between the adjacent lobes. Accordingly, the columns will have a sloped configuration that corresponds with the sidewall slope.

The material that forms the chamber will generally be a polymer, such as a thermoplastic elastomer, thereby providing the structure of a bladder. Alternately, the chamber may be formed as a void within a midsole of the footwear. Although a plurality of fluids may be utilized within the chamber, air generally provides properties that are suitable for the invention.

The invention also relates to a method of manufacturing a fluid-filled chamber for an article of footwear. The method involves positioning a parison between a first portion and a corresponding second portion of a mold. The parison is then bent with contours of the mold as the first portion and the second portion translate toward each other, the contours of the mold being positioned separate from a cavity within the mold, the cavity having a shape of the chamber. Opposite sides of the parison are then shaped to form the chamber within the cavity, and the opposite sides of the parison are bonded together.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Introduction

The following discussion and accompanying figures disclose articles of athletic footwear incorporating fluid-filled chambers in accordance with the present invention. Concepts related to the footwear, and more particularly the fluid-filled chambers, are disclosed with reference to footwear having a configuration that is suitable for running. The invention is not solely limited to footwear designed for running, however, and may be applied to a wide range of athletic footwear styles, including basketball shoes, cross-training shoes, walking shoes, tennis shoes, soccer shoes, and hiking boots, for example. In addition, the invention may also be applied to non-athletic footwear styles, including dress shoes, loafers, sandals, and work boots. Accordingly, one skilled in the relevant art will appreciate that the concepts disclosed herein apply to a wide variety of footwear styles, in addition to the specific style discussed in the following material and depicted in the accompanying figures.

First Chamber

Figure 1:
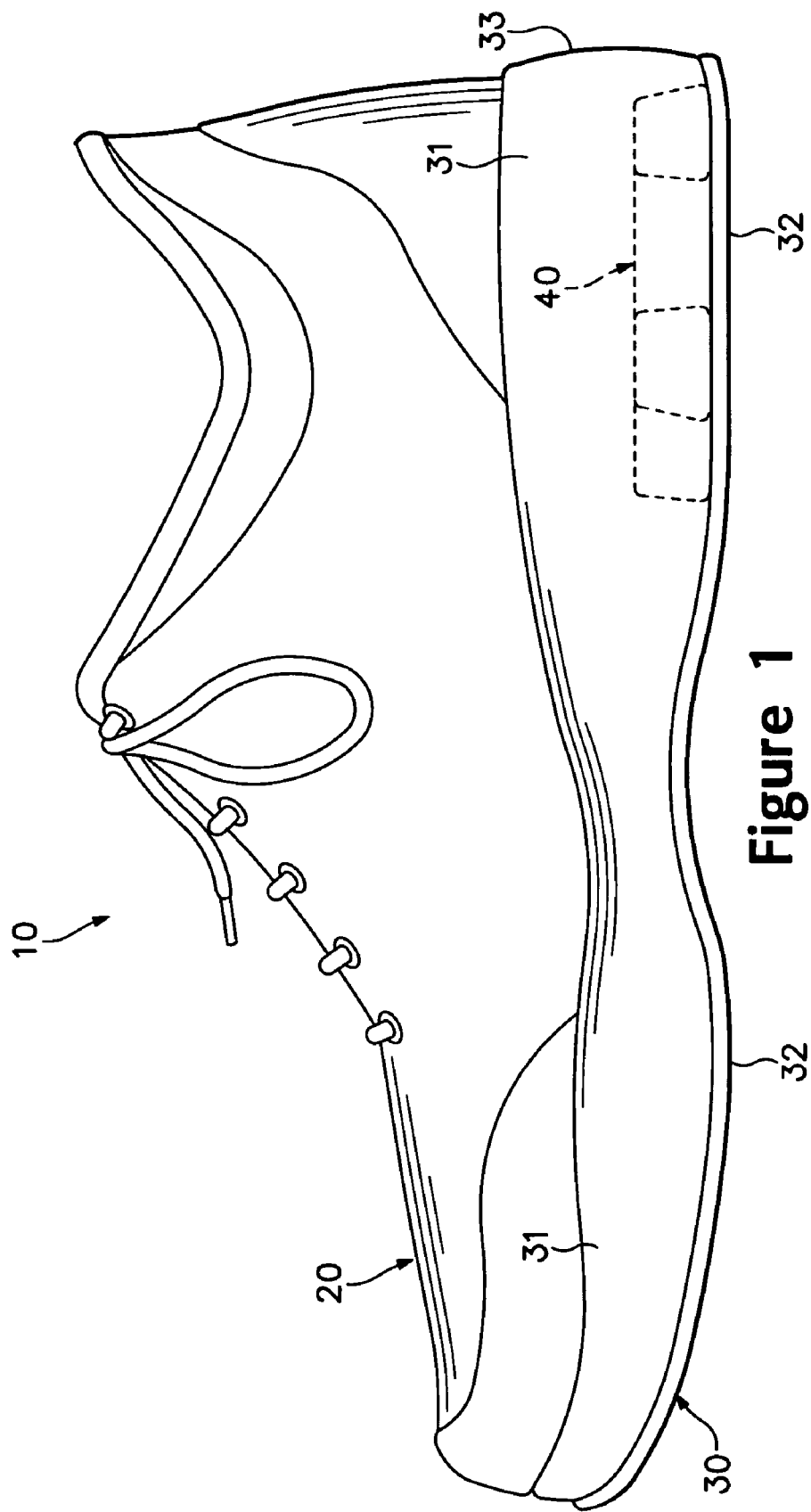
FIG. 1 is a side elevational view of an article of footwear having a midsole that incorporates a first chamber in accordance with the present invention.

An article of footwear 10 is depicted in FIG. 1 and includes an upper 20 and a sole structure 30. Upper 20 has a substantially conventional configuration and includes a plurality of elements, such as textiles, foam, and leather materials, that are stitched or adhesively bonded together to form an interior void for securely and comfortably receiving the foot. Sole structure 30 is positioned below upper 20 and includes two primary elements, a midsole 31 and an outsole 32. Midsole 31 is secured to a lower surface of upper 20, through stitching or adhesive bonding for example, and operates to attenuate forces and absorb energy as sole structure 30 contacts the ground. That is, midsole 31 is structured to provide the foot with cushioning during walking or running, for example. Outsole 32 is secured to a lower surface of midsole 31 and is formed of a durable, wear-resistant material that engages the ground. In addition, sole structure 30 may include an insole, which is a thin cushioning member, located within the void and adjacent to the foot to enhance the comfort of footwear 10.

Figure 2:
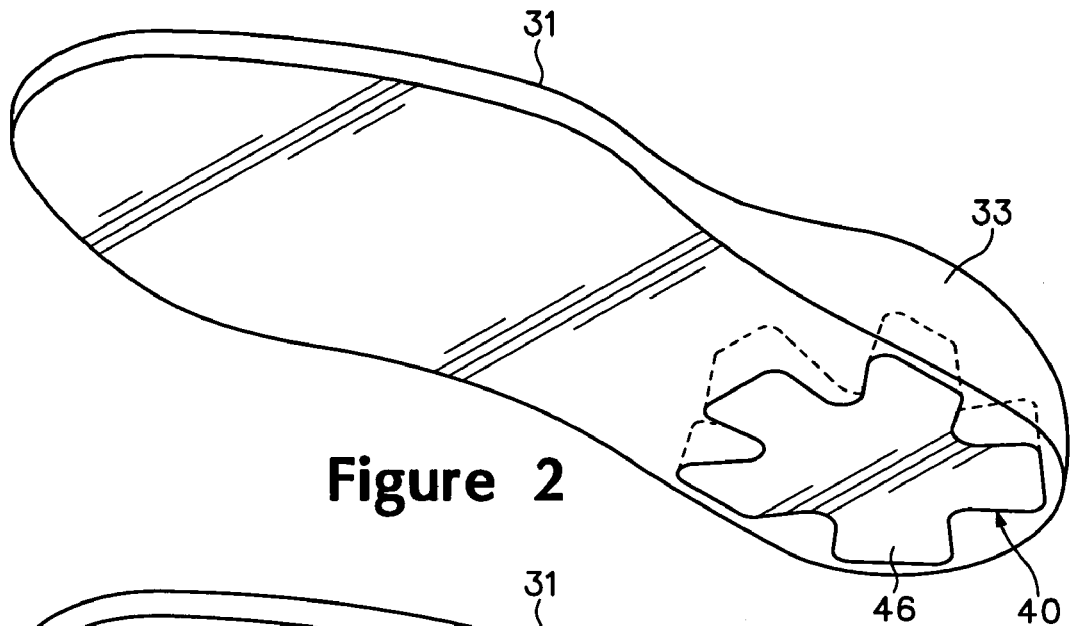
FIG. 2 is a perspective view of the midsole depicted in FIG. 1.
Figure 3:
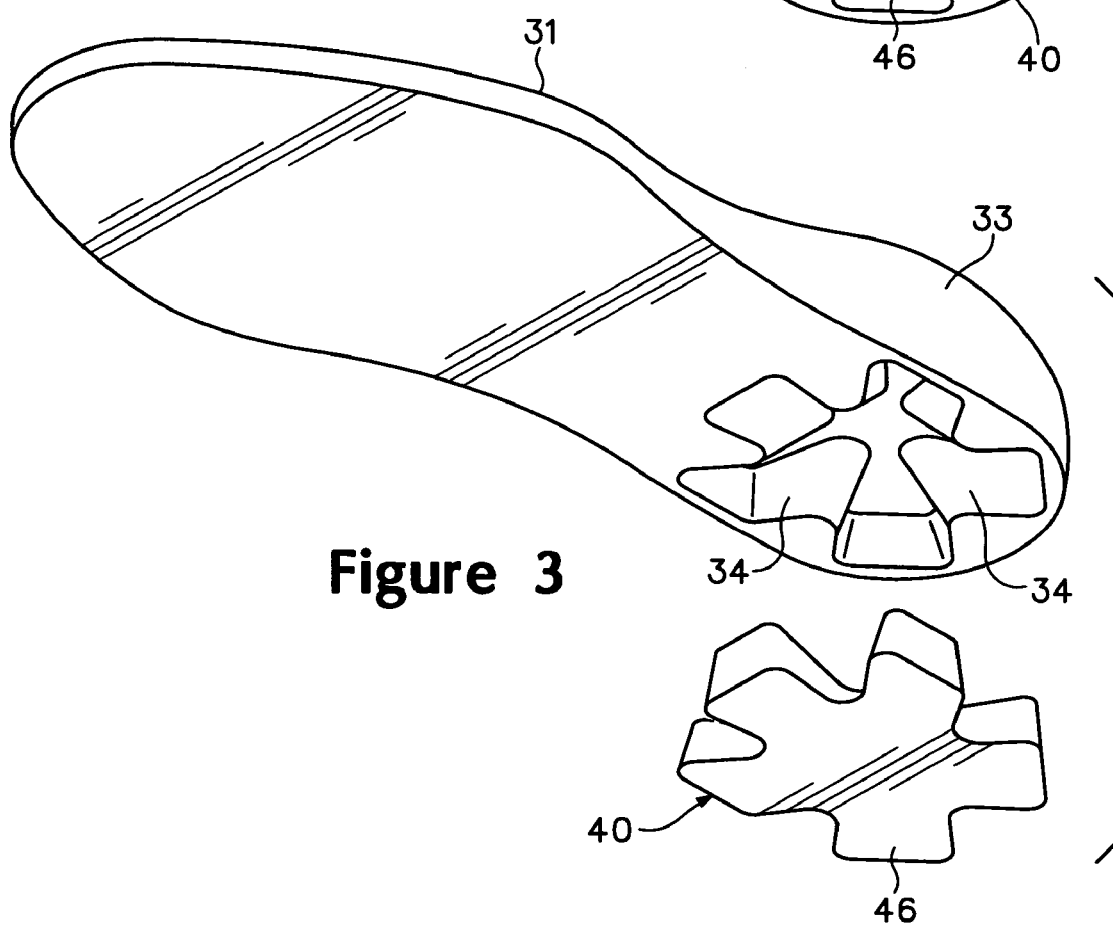
FIG. 3 is a exploded perspective view of the midsole depicted in FIG. 1.
Figure 4:
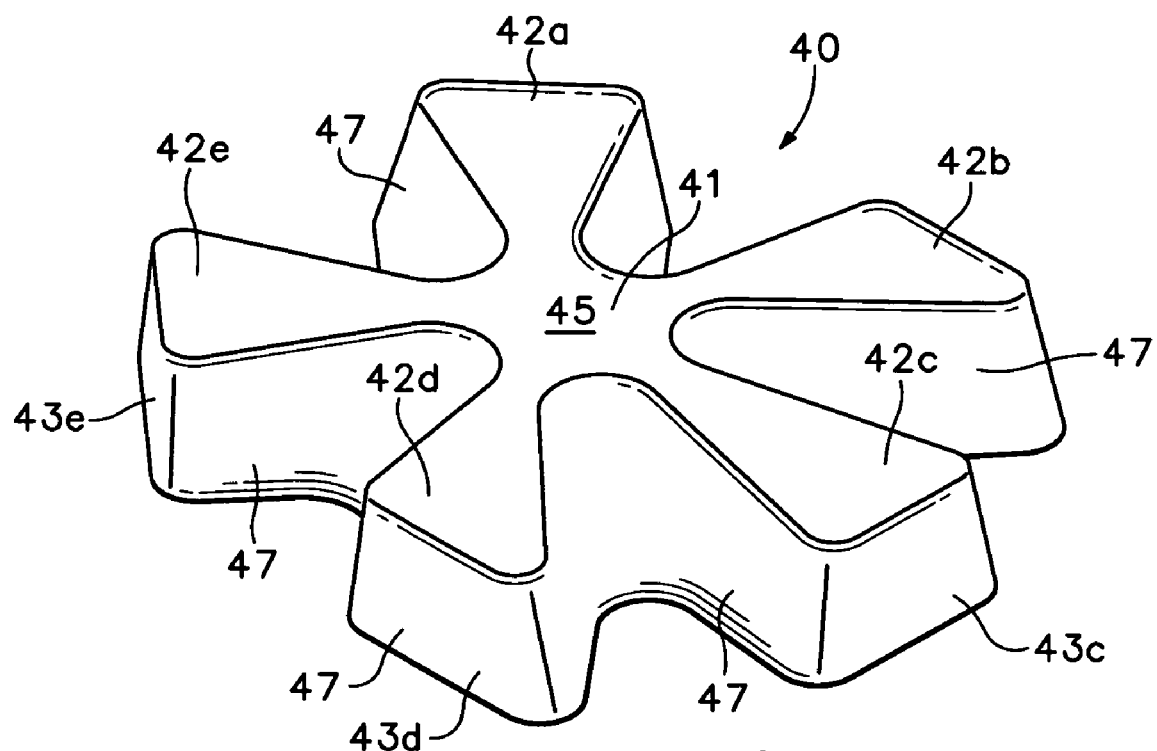
FIG. 4 is a perspective view of the first chamber.
Figure 5:
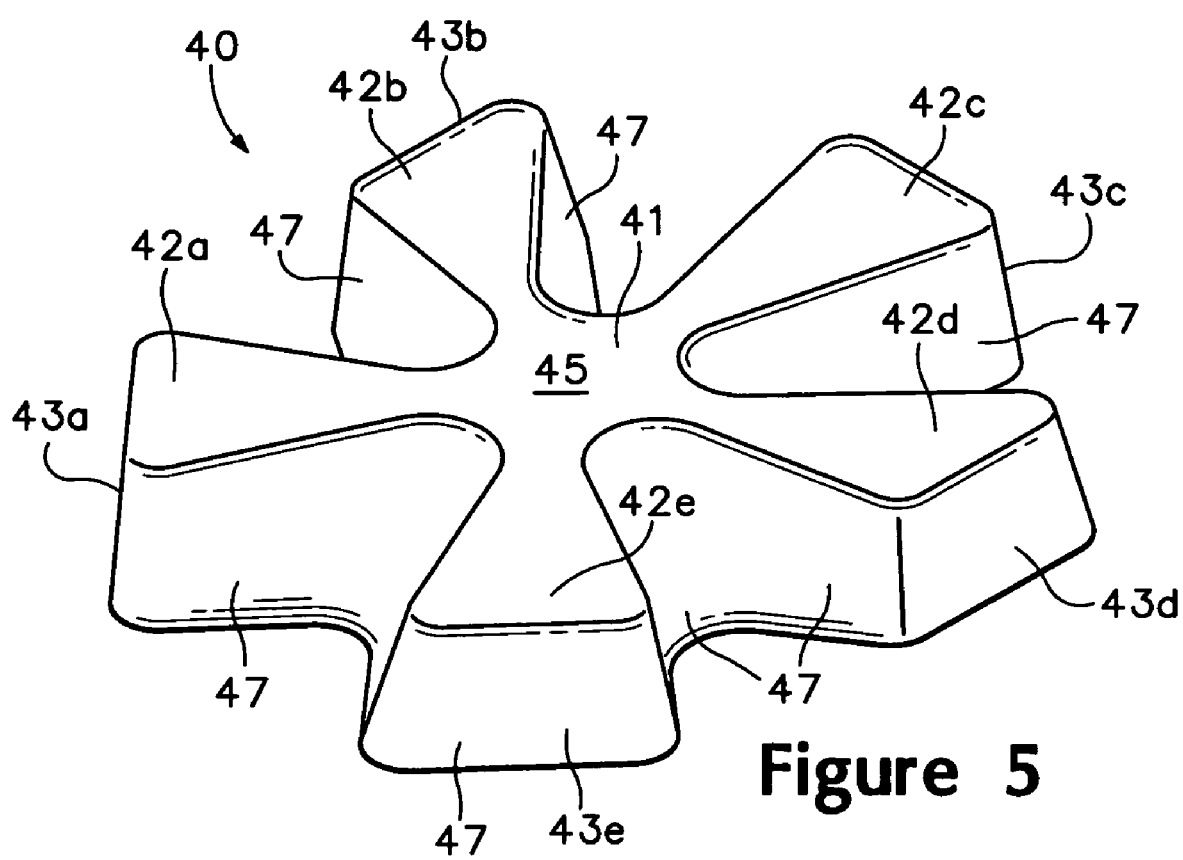
FIG. 5 is another perspective view of the first chamber.

Midsole 31 is primarily formed of a polymer foam material, such as polyurethane or ethylvinylacetate, that encapsulates a fluid-filled chamber 40. As depicted in FIGS. 2 and 3, chamber 40 is positioned in a heel region of midsole 31, which corresponds with the area of highest initial load during footstrike. Chamber 40 may, however, be positioned in any region of midsole 31 to obtain a desired degree of cushioning response. Furthermore, midsole 31 may include multiple fluid-filled chambers having the general configuration of chamber 40.

Chamber 40 is depicted as having the structure of a bladder, wherein sealed layers of polymeric material enclose a fluid. Alternately, chamber 40 may be formed as a void within midsole 31. That is, material having the shape of chamber 40 may be absent from midsole 31, thereby forming chamber 40.

In comparison with chambers of the prior art, chamber 40 and its arrangement in the foam material of midsole 31 produces a relatively large deflection for a given load during initial stages of compression. As the compression of chamber 40 increases, however, the stiffness of chamber 40 increases in a corresponding manner. This response to compression, which will be described in greater detail in the following material, is due to the structure of chamber 40 and the manner in which chamber 40 is incorporated into midsole 31. In general, the structure of chamber 40 may be characterized as a single chamber, fluid-filled bladder. More particularly, chamber 40 has a central area 41 surrounded by five lobes 42a-42e that each have a distal end 43a-43e, respectively, as depicted in FIGS. 4-7. Lobes 42a-42e extend radially outward from central area 41. Accordingly, lobes 42a-42e may extend outward in different directions from a periphery of central area 41. In combination with the foam material of midsole 31, which fills the spaces between lobes 42a-42e, midsole 31 provides an appropriate ratio of air to foam in specific areas under the heel of the foot.

Figure 6A:
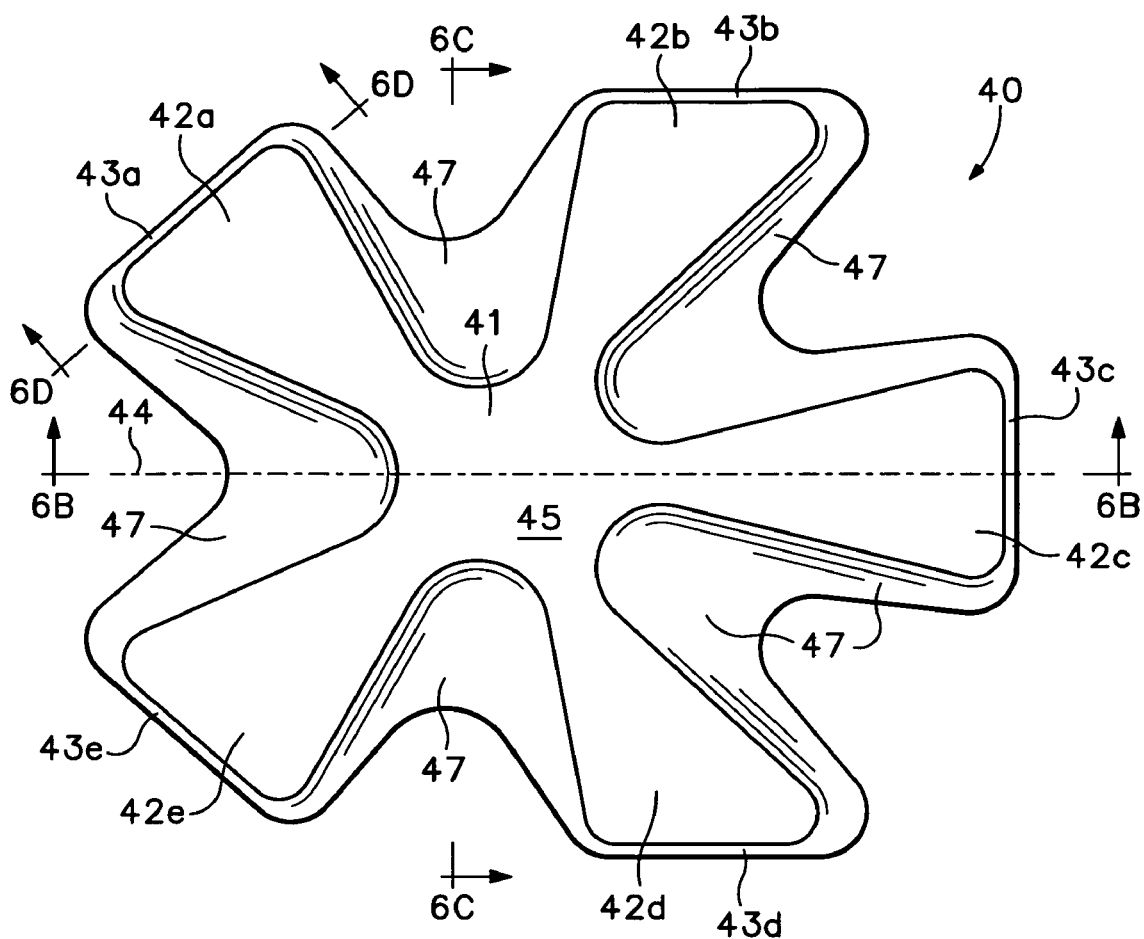
FIG. 6A is a top plan view of the first chamber.
Figure 7:
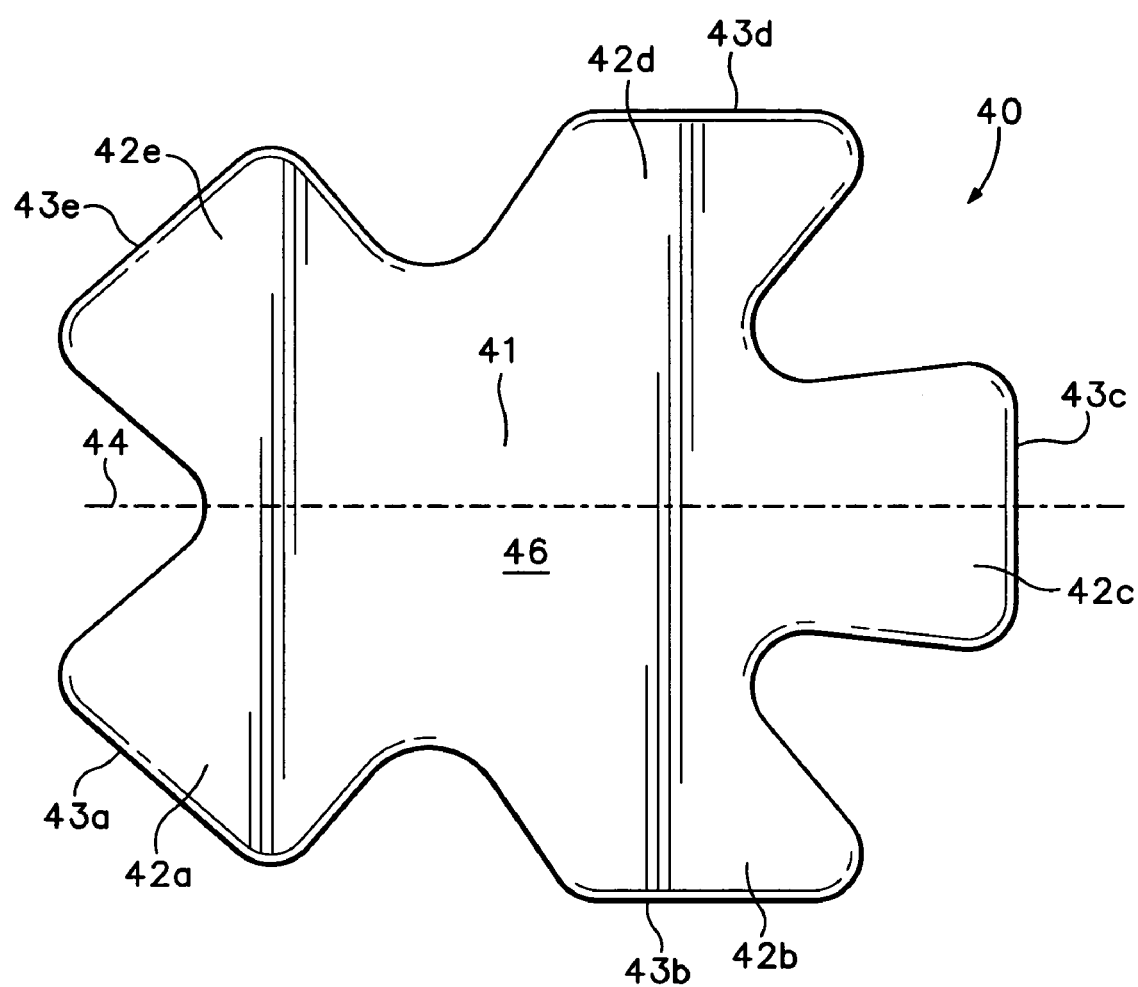
FIG. 7 is a bottom plan view of the first chamber.

For purposes of reference, a longitudinal axis 44 is depicted in FIGS. 6A and 7 as extending through central area 41 and lobe 42c. Chamber 40 is symmetrical about a plane that extends through axis 44 and is generally perpendicular to the plane of FIGS. 6A and 7, while otherwise being asymmetrical. Accordingly, the structure of chamber 40 generally resembles the shape of an oak leaf. Chamber 40 also includes a first surface 45, an opposite second surface 46, and a sidewall 47 that extends between first surfaces 45 and 46. Both first surface 45 and second surface 46 have a generally planar configuration and are uniformly spaced apart from each other. First surface 45 has the general shape of second surface 46, but with a reduced area. Accordingly, sidewall 47 slopes in the area between the individual lobes 42a-42e. For example, the slope of sidewall 47 may be approximately 40 degrees adjacent to central area 41, approximately 80 degrees adjacent to distal ends 43a-43e, and gradually changing from 40 degrees to 80 degrees in the area between. At the position of distal ends 43a-43e, however, sidewall 47 has a substantially vertical slope of 90 degrees. Sidewall 47 may have a substantially planar configuration that forms an angle with respect to first surface 45, or sidewall 47 may be curved.

The specific configuration of midsole 31 and the orientation of chamber 40 may vary within the scope of the invention. When encapsulated by the polymer foam material in midsole 31, for example, a portion of distal ends 43a-43e may extend to an edge 33 of midsole 31, and may extend through edge 33 such that they are visible from the exterior of footwear 10. Furthermore, first surface 45 may be coextensive with the plane of the upper surface of midsole 31 such that the heel engages first surface 45. Alternately, chamber 40 may be entirely embedded within the foam material of midsole 31, or may be positioned with second surface 46 being coextensive with the plane of the upper surface of midsole 31. As depicted in FIGS. 1-3, however, distal ends 43a-43e do not extend through edge 33 and second surface 46 is positioned adjacent a lower surface of midsole 31. This configuration places a portion of the foam material in midsole 31 between the foot and first surface 45.

Figure 6B:
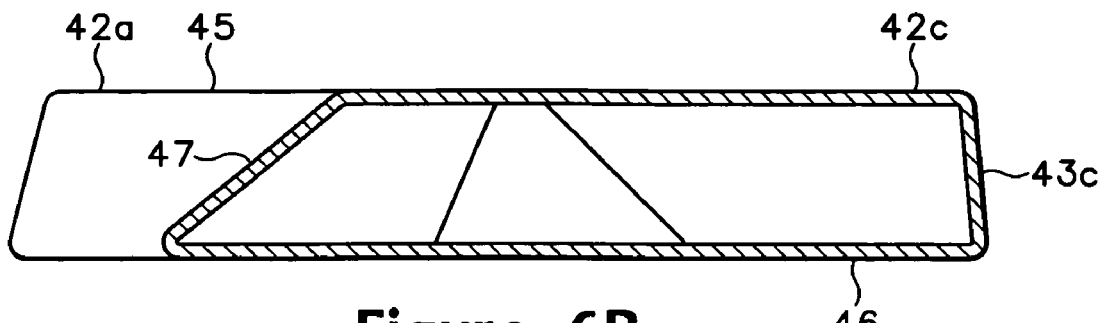
FIG. 6B is a cross-section of the first chamber, as defined by line 6B-6B in FIG. 6A.
Figure 6C:
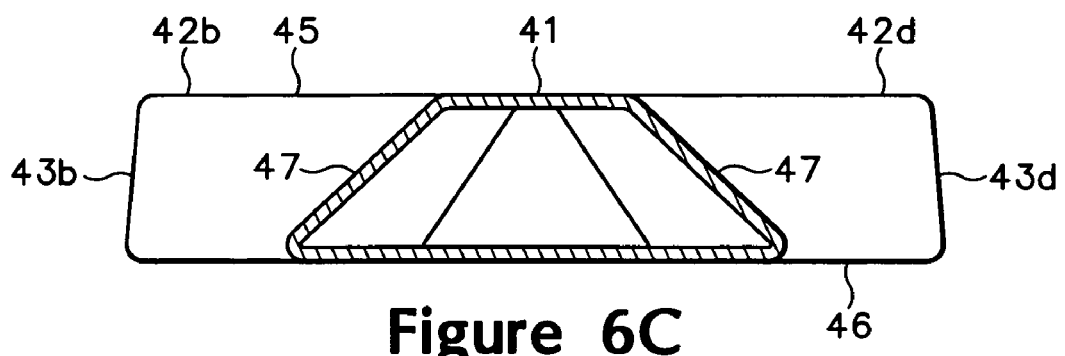
FIG. 6C is another cross-section of the first chamber, as defined by line 6C-6C in FIG. 6A.
Figure 6D:
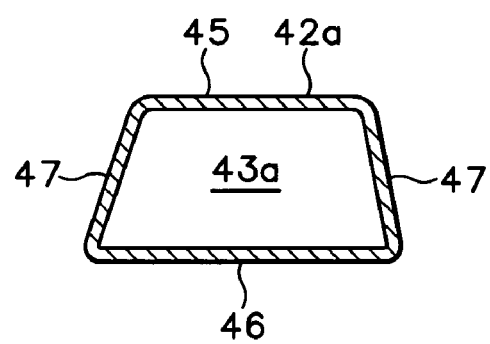
FIG. 6D is yet another cross-section of the first chamber, as defined by line 6D-6D in FIG. 6A.

The slope of sidewall 47, which is depicted in the cross-sectional views of FIGS. 6B-6D, varies around chamber 40 to provide a smooth transition from chamber 40 to the polymer foam material of midsole 31 during compression. As discussed above, sidewall 47 slopes from approximately 40 degrees to 80 degrees between adjacent lobes 42a-42e and has a substantially vertical slope at distal ends 43a-43e. The spaces between adjacent lobes 42a-42e have a generally U-shaped configuration in plan view, which is created by a curved surface of sidewall 47. The portion of sidewall 47 positioned between adjacent lobes 42a-42e has a slope that is greater in areas adjacent to distal ends 43a-43e than in areas adjacent to central area 41. More specifically, sidewall 47 has a relatively shallow slope adjacent to central area 41, which corresponds with the rounded portion of the U-shaped configuration. As sidewall 47 extends between central area 41 and distal ends 43a-43e, the slope increases. At distal ends 43a-43e, however, the slope of sidewall 47 is substantially vertical. In other embodiments of the present invention, however, the slope of sidewall 47 may differ from the specific configuration discussed herein to provide different degrees of transition during compression.

The slopes of sidewall 47 between the various lobes 42a-42e are inversely matched by the resilient foam material of midsole 31. Accordingly, midsole 31 has a configuration with a plurality of columns 34 that are formed of the foam material and extend between lobes 42a-42e to contact the various areas of sidewall 47. The height of each column 34 increases from positions adjacent to first surface 45 to positions adjacent to second surface 46, and each column 34 slopes in a manner that corresponds with sidewall 47. Furthermore, due to the increasing spacing between lobes 42a-42e as they extend radially outward from central area 42, the width of each column 43 increases accordingly.

A variety of materials may be utilized to form first surface 45, second surface 46, and sidewall 47, including the polymeric materials that are conventionally utilized in forming the outer layers of fluid-filled chambers for footwear, as discussed in the Background of the Invention section. In contrast with a majority of the prior art chamber structures, however, the fluid within chamber 40 is at ambient pressure or at a pressure that is slightly elevated from ambient. Accordingly, the pressure of the fluid within chamber 40 may range from a gauge pressure of zero to over five pounds per square inch. Due to the relatively low pressure within chamber 40, the materials utilized to form first surface 45, second surface 46, and sidewall 47 need not provide the barrier characteristics that operate to retain the relatively high fluid pressures of prior art chambers. Accordingly, a wide range of polymeric materials such as thermoplastic urethane may be utilized to form first surface 45, second surface 46, and sidewall 47, and a variety of fluids such as air may be utilized within chamber 40. Furthermore, the wide range of polymeric materials may be selected based upon the engineering properties of the material, such as the dynamic modulus and loss tangent, rather than the ability of the material to prevent the diffusion of the fluid contained by chamber 40. When formed of thermoplastic polyurethane, first surface 45, second surface 46, and sidewall 47 may have a thickness of approximately 0.040 inches, but the thickness may range, for example, from 0.018 inches to 0.060 inches.

The relatively low pressure of the fluid within chamber 40 also provides another difference between chamber 40 and prior art chambers. The relatively high pressure in prior art chambers often requires the formation of internal connections between the polymer layers to prevent the chamber from expanding outward to a significant degree. That is, internal connections were utilized in prior art chambers to control overall thickness of the chambers. In contrast, chamber 40 does not have internal connections between first surface 45 and second surface 46.

Chamber 40 may be manufactured through a variety of manufacturing techniques, including blow-molding, thermoforming, and rotational molding, for example. With regard to the blow-molding technique, thermoplastic material is placed in a mold having the general shape of chamber 40 and pressurized air is utilized to induce the material to coat surfaces of the mold. In the thermoforming technique, layers of thermoplastic material are placed between corresponding portions of a mold, and the mold is utilized to compress the layers together at peripheral locations of chamber 40. A positive pressure may be applied between the layers of thermoplastic material to induce the layers into the contours of the mold. In addition, a vacuum may be induced in the area between the layers and the mold to draw the layers into the contours of the mold.

Chamber 40 and its arrangement in the foam material of midsole 31 produces a relatively large deflection for a given load during initial stages of compression when compared to the fluid-filled chambers discussed in the Background of the Invention section. As the compression of chamber 40 increases, however, the stiffness of chamber 40 increases in a corresponding manner due to the structure of chamber 40 and the manner in which chamber 40 is incorporated into midsole 31. Three phenomena operate simultaneously to produce the effect described above and include pressure ramping, the properties of the foam material in midsole 31, and film tensioning. Each of these phenomena will be described in greater detail below.

Pressure ramping is the increase in pressure within chamber 40 that occurs as a result of compressing chamber 40. In effect, chamber 40 has an initial pressure and initial volume when not being compressed within midsole 31. As midsole 31 is compressed, however, the effective volume of chamber 40 decreases, thereby increasing the pressure of the fluid within chamber 40. The increase in pressure operates to provide a portion of the cushioning response of midsole 31.

The properties of the foam material also affect the cushioning response of midsole 31, and will be discussed in terms of the configuration of the foam material and the hardness of the foam material. With regard to the configuration, the foam material in midsole 31, which may have a hardness of 50-90 on the Asker C scale, for example, is concentrated adjacent edge 33 and is less prevalent in areas corresponding with the center of chamber 40. A change in the number of lobes 42*a*-42*e* may be utilized, for example, to decrease the ratio of air to foam in peripheral portions of midsole 31. This type of change in midsole 31 may be utilized to increase the overall stiffness of midsole 31 during compression. Accordingly, the geometry of the foam material and the corresponding geometry of chamber 40 have an effect upon the cushioning response.

Finally, the concept of film tensioning has an effect upon the cushioning response. This effect is best understood when compared to pressurized prior art chambers. In the prior art chambers, the pressure within the chambers places the outer layers in tension. As the prior art chambers are compressed, however, the tension in the outer layers is relieved or lessened. Accordingly, compression of the prior art chambers operates to lessen the tension in the outer layers. In contrast with the pressurized prior art chambers, the tension in first surface 45 increases in response to compression due to bending of first surface 45. This increase in tension contributes to the cushioning response discussed above. In applications where chamber 40 is rotated such that second surface 46 is positioned adjacent the foot, the tension in second surface 46 will increase in response to compression, thereby contributing to the cushioning response Pressure ramping, the properties of the foam material, and film tensioning operate together to attenuate forces and absorb energy. The specific effect that pressure ramping, the properties of the foam material, and film tensioning has upon the cushioning response varies based upon location with respect to chamber 40. At perimeter portions of chamber 40, which corresponds with the locations of distal ends 43*a*-43*e*, the properties of the foam material provides reduced compliance and, therefore, increases the corresponding stiffness. As the location tends toward central area 41, columns 34 taper and allow a relatively large deflection, and the dominant phenomena that attenuate forces and absorb energy are film tensioning and pressure ramping. One skilled in the relevant art will recognize, based upon the preceding discussion, that the specialized cushioning response of sole structure 30 is primarily related to the general configuration of chamber 40 and the foam material of midsole 31 disclosed herein.

Based upon the considerations of pressure ramping, the properties of the foam material, and film tensioning, the cushioning response of midsole 31 is modifiable to provide a desired degree of force attenuation and energy absorption. For example, the volume of chamber 40, the number and shape of lobes 42*a*-42*e*, the slope of sidewall 47, the thickness of surfaces 45 and 46, the material utilized to form the exterior of chamber 40, and the position and orientation of chamber 40 within midsole 31 may be varied to modify the cushioning response. In addition, the properties of the foam material, including the hardness and thickness, may also be adjusted to modify the cushioning response. By varying these and other parameters, therefore, midsole 31 may be custom tailored to a specific individual or to provide a specific cushioning response during compression.

Second Chamber

Figure 8:
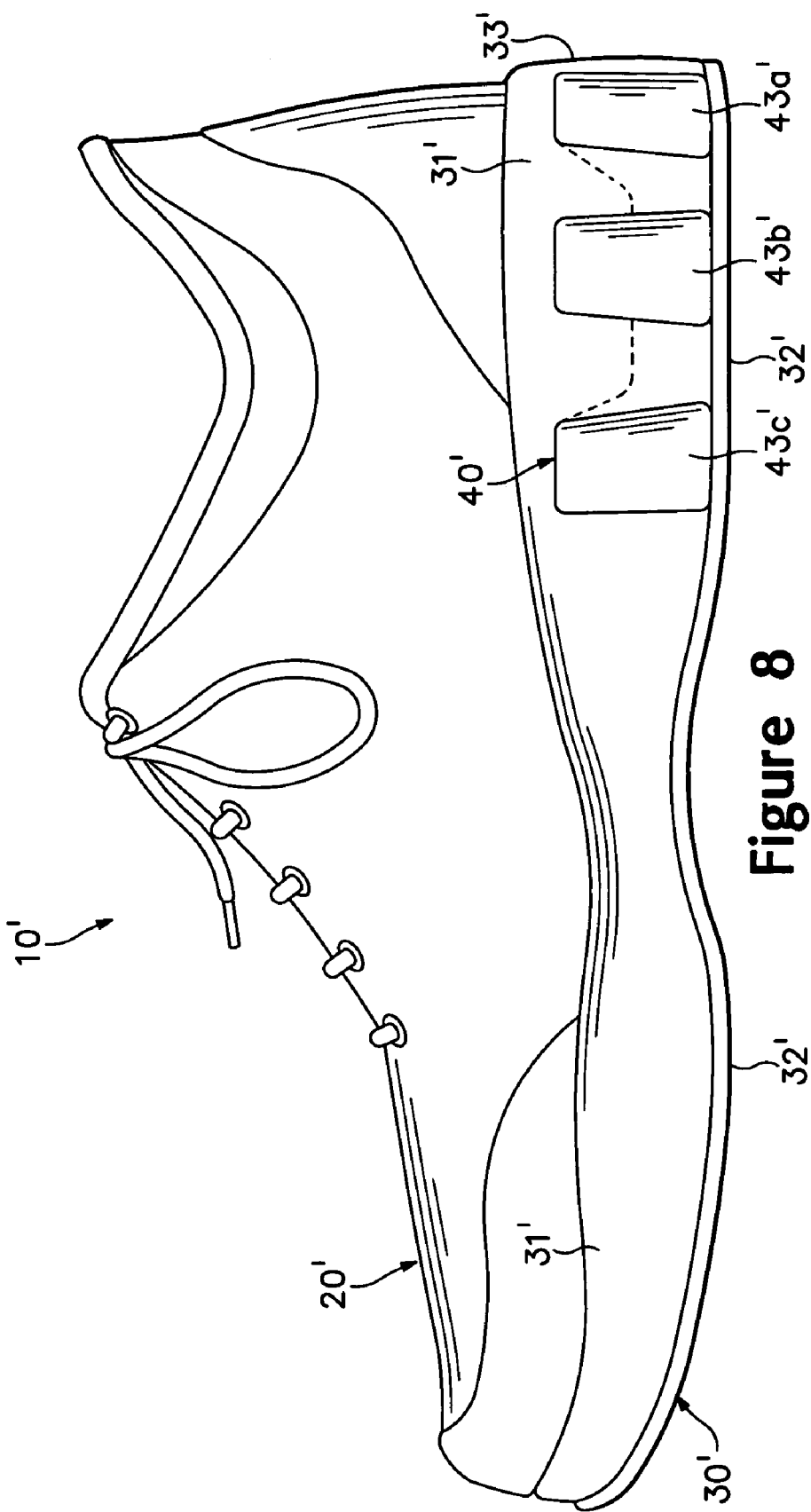
FIG. 8 is a side elevational view of another article of footwear having a midsole that incorporates a second chamber in accordance with the present invention.

Another embodiment of the present invention is depicted as footwear 10' in FIG. 8. Footwear 10' includes an upper 20' and a sole structure 30'. Upper 20' has a substantially conventional configuration that forms an interior void for securely and comfortably receiving the foot. Sole structure 30' is positioned below upper 20' and includes two primary elements, a midsole 31' and an outsole 32'. Midsole 31' is secured to a lower surface of upper 20' and operates to attenuate forces and absorb energy as sole structure 30' contacts the ground. Outsole 32' is secured to a lower surface of midsole 31' and is formed of a durable, wear-resistant material that engages the ground. In addition, sole structure 30' may include an insole, which is a thin cushioning member, located within the void and adjacent to the foot to enhance the comfort of footwear 10'. Accordingly, footwear 10' is generally similar in structure to footwear 10 discussed above. A primary difference of footwear 10', however, is the structure of midsole 31', and more specifically the structure of a chamber 40' that is embedded within a foam material of midsole 31'.

Figure 9:
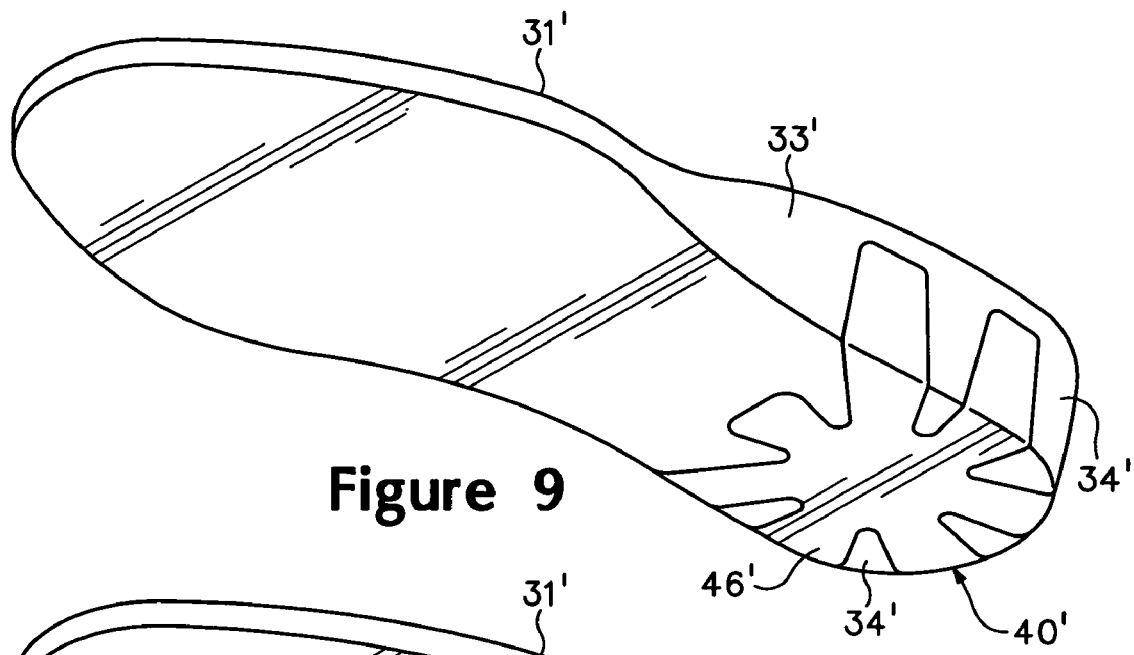
FIG. 9 is a perspective view of the midsole depicted in FIG. 8.
Figure 10:
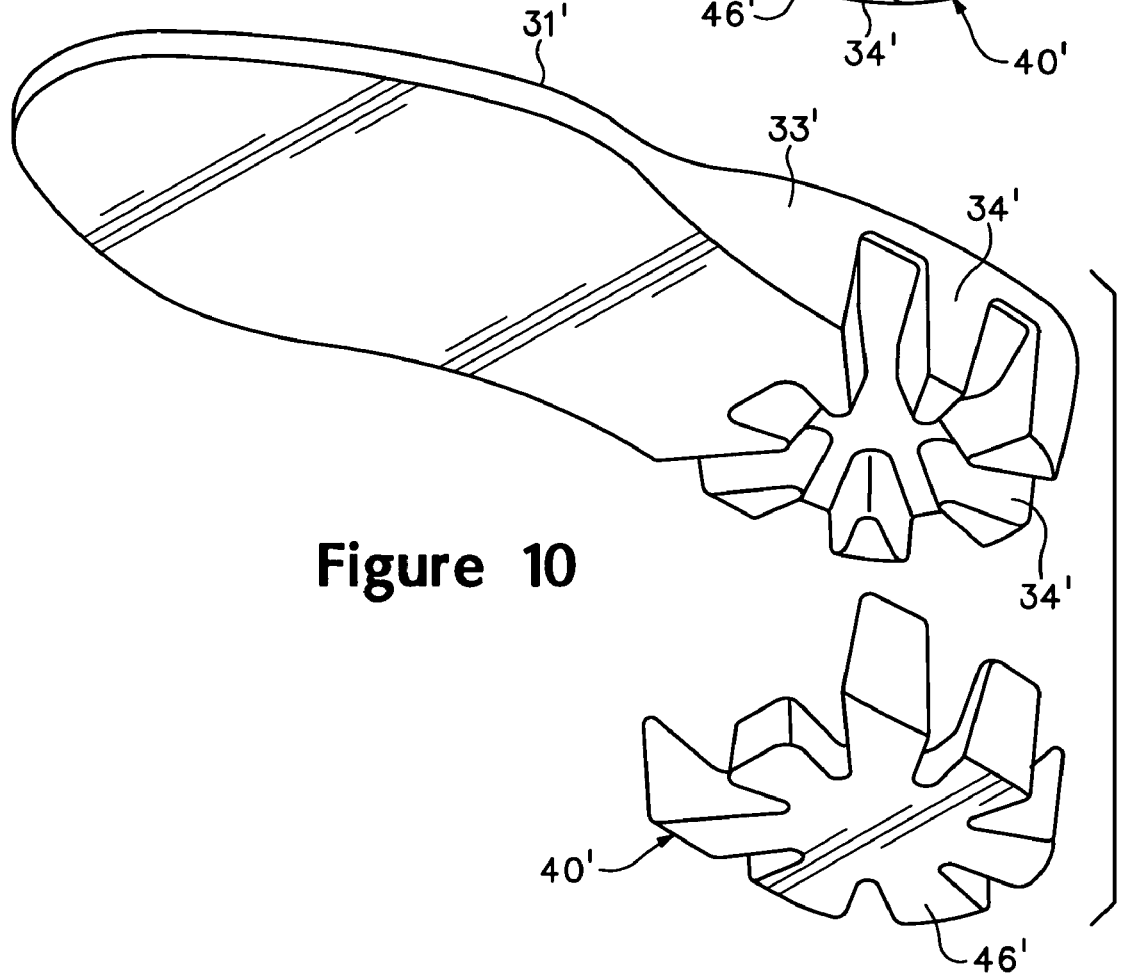
FIG. 10 is an exploded perspective view of the midsole depicted in FIG. 8.
Figure 11:
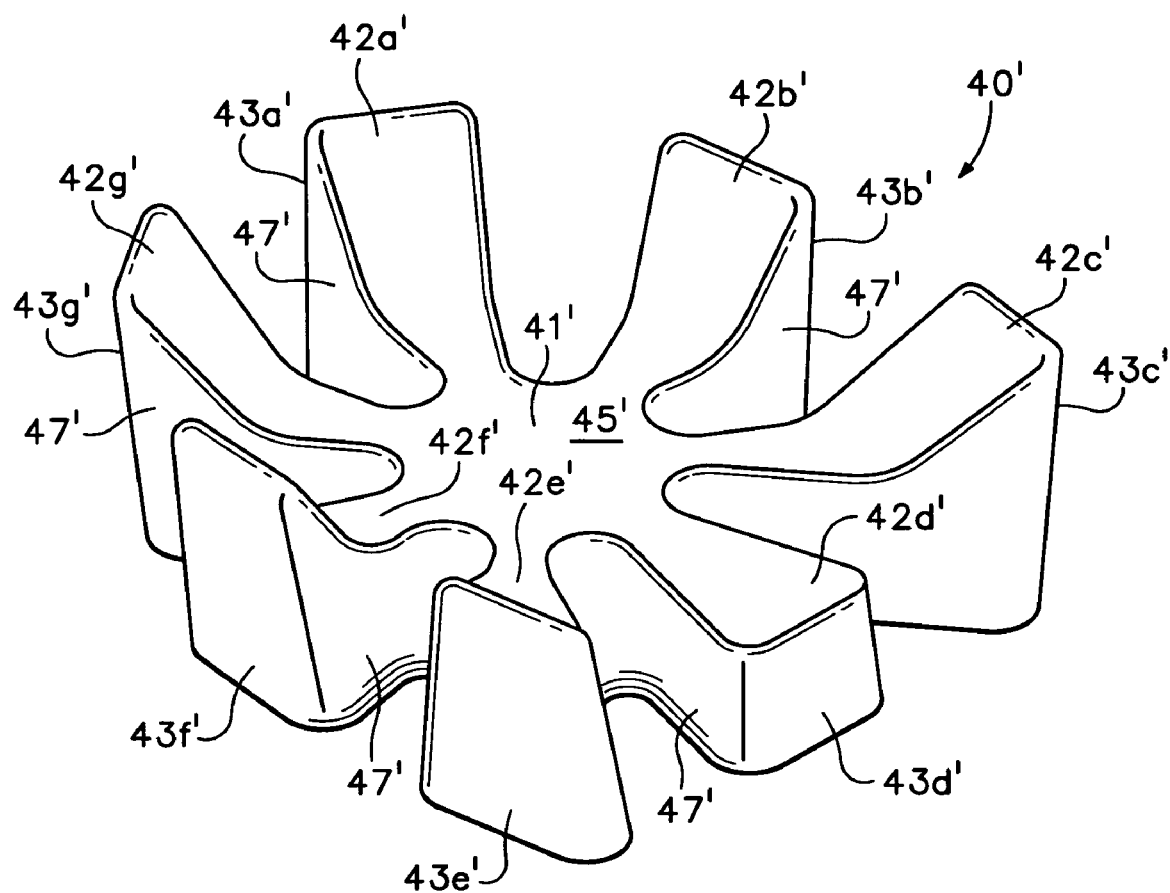
FIG. 11 is a perspective view of the second chamber.
Figure 12:
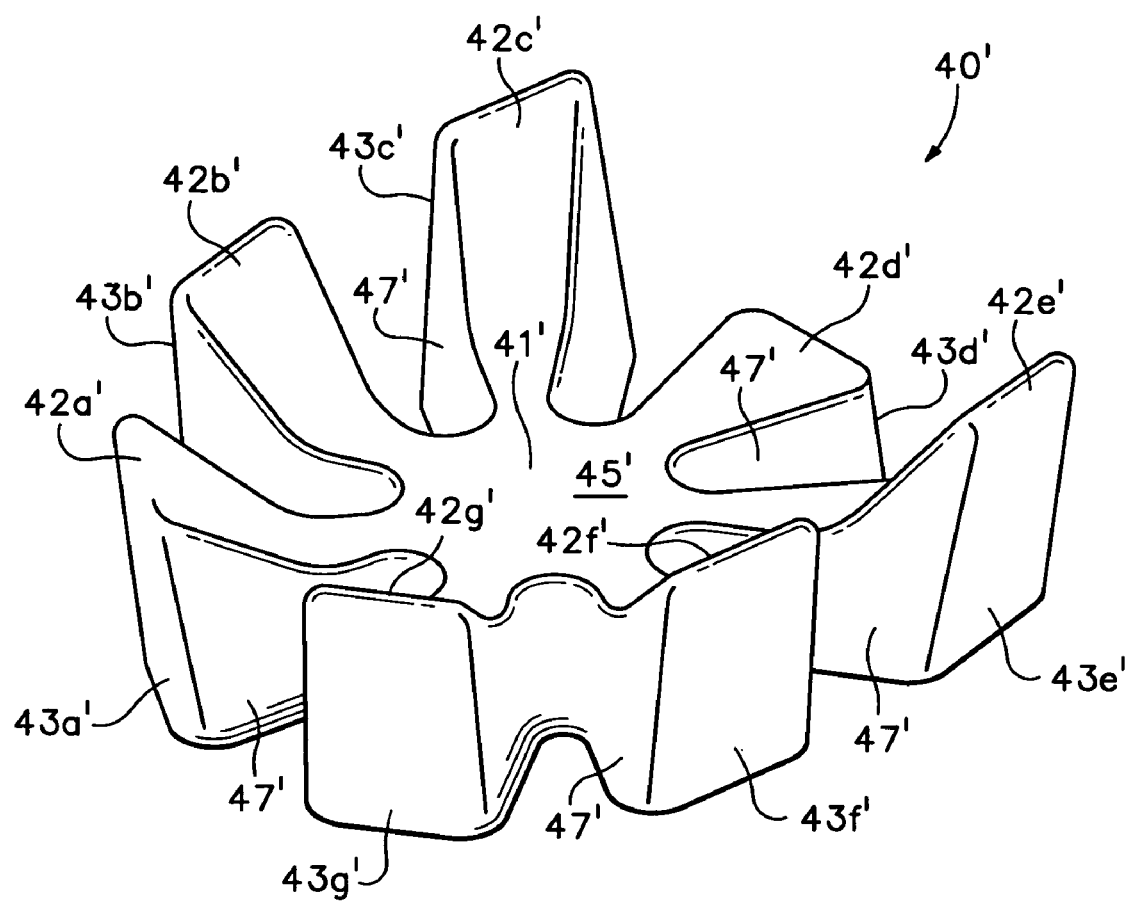
FIG. 12 is another perspective view of the second chamber.

Midsole 31' is primarily formed of a polymer foam material, such as polyurethane or ethylvinylacetate, and chamber 40' is positioned within a heel area of midsole 31', as depicted in FIGS. 9 and 10. Chamber 40' is depicted individually in FIGS. 11-15 and includes a central area 41', seven lobes 42*a'*-42*g'*, and seven corresponding distal ends 43*a'*-43*g'*. In addition, chamber 40' includes an axis 44' for purposes of reference, a first surface 45', a second surface 46', and a sidewall 47'. Chamber 40' is symmetrical about a plane that extends through axis 44' and is generally perpendicular to the plane of first surface 45' and second surface 46', while otherwise being asymmetrical. Whereas chamber 40 has surfaces 45 and 46 with a substantially planar configuration, first surface 45' of chamber 40' has a curved configuration. That is, portions of first surface 45' adjacent to distal ends 43*a'*-43*c'* and 43*e'*-43*g'* curve upward to form a rounded or concave structure. In contrast, the portion of first surface 45' on lobe 42*d'* has a substantially flat configuration.

With reference to FIGS. 9 and 10, the position of chamber 40' in midsole 31' is depicted. In general, chamber 40' is positioned such that second surface 46' is coextensive with a lower surface of the foam material in midsole 31'. This configuration places a portion of the foam material in midsole 31' between the foot and first surface 45'. Distal ends 43*a'*-43*c'* and 43*e'*-43*g'* are also coextensive with an edge 33' of midsole 31'. Accordingly, distal ends 43*a'*-43*c'* and 43*e'*-43*g'* are visible from an exterior of footwear 10'. Due to the curved configuration of second surface 46', lobes 42*a'*-42*c'* and 42*e'*-42*g'* increase in height and volume as they radiate outward from central area 41' to distal ends 43*a'*-43*c'* and 43*e'*-43*g'*. The increase in volume permits a greater volume of fluid to migrate from central area 41' to distal ends 43*a'*-43*c'* and 43*e'*-43*g'* during compression, thereby providing a more gradual transition from a relatively compliant cushioning response to a relatively stiff cushioning response. Furthermore, the increase in volume at the distal ends 43*a'*-43*c'* and 43*e'*-43*g'* reduces the overall fluid pressure within chamber 40' for a given degree of compression.

Figure 13A:
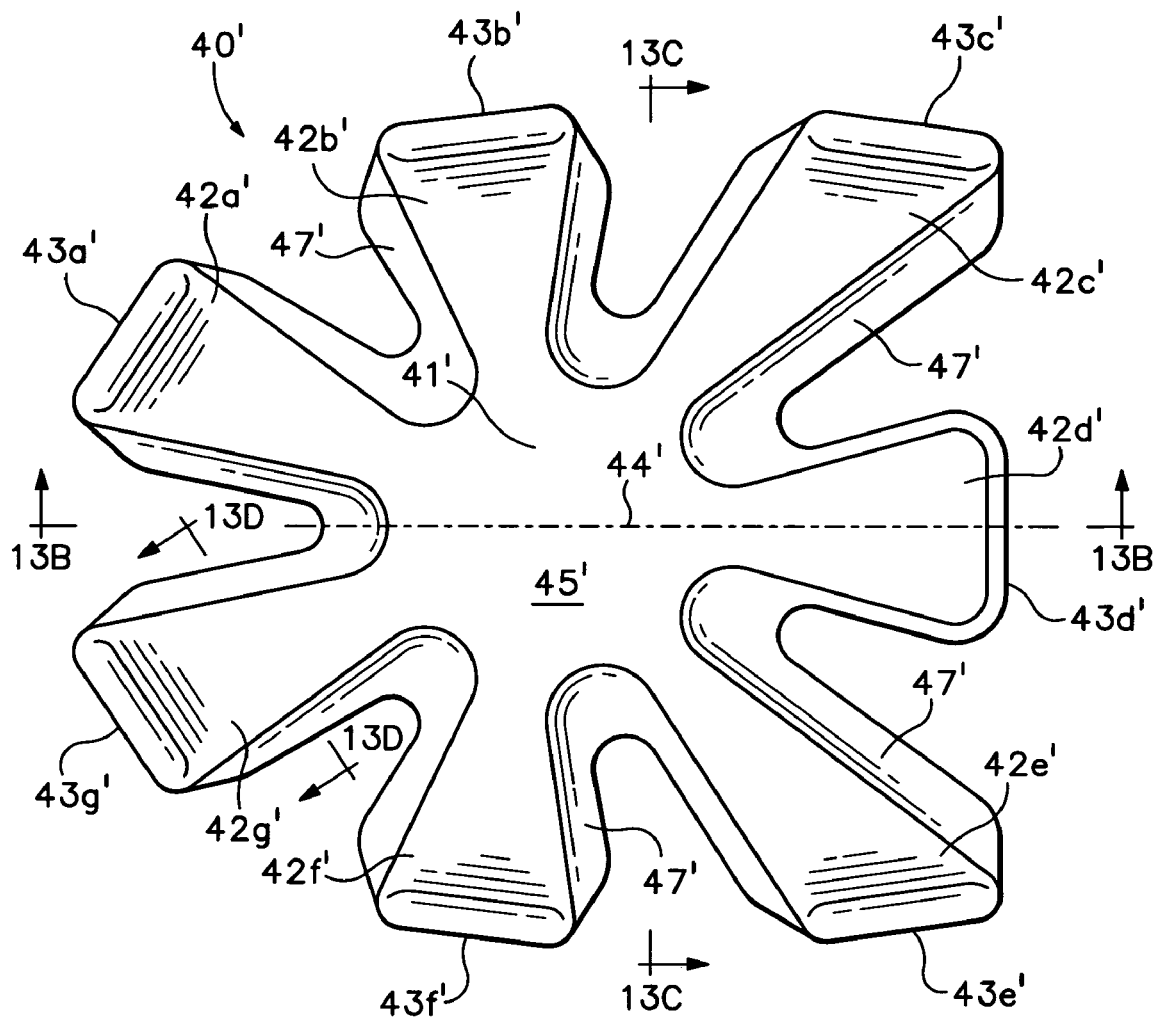
FIG. 13A is a top plan view of the second chamber.
Figure 13B:
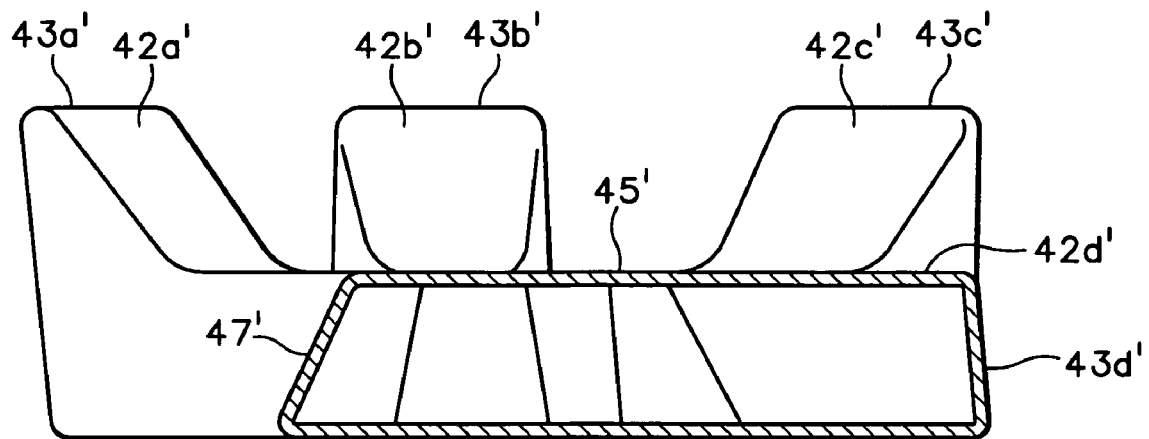
FIG. 13B is a cross-section of the second chamber, as defined by line 13B-13B in FIG. 6A.
Figure 13C:
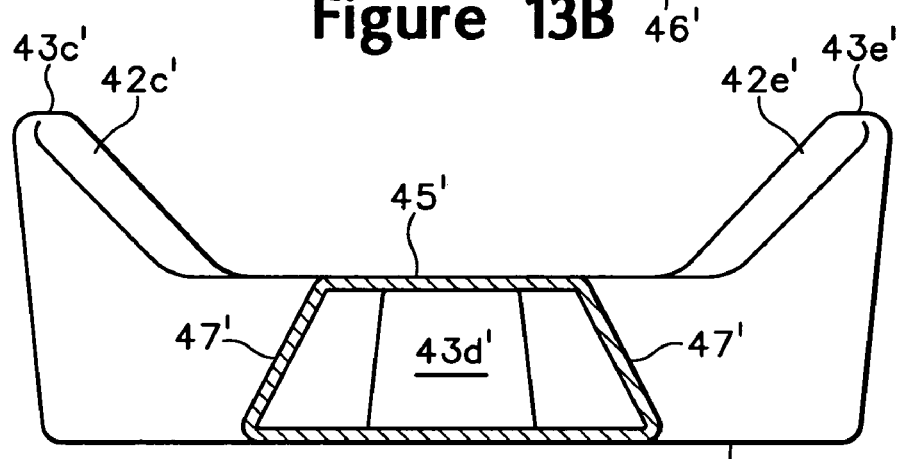
FIG. 13C is another cross-section of the second chamber, as defined by line 13C-13C in FIG. 6A.
Figure 13D:
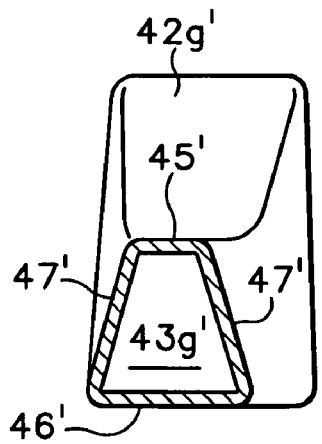
FIG. 13D is yet another cross-section of the second chamber, as defined by line 13D-13D in FIG. 13A.
Figure 14:
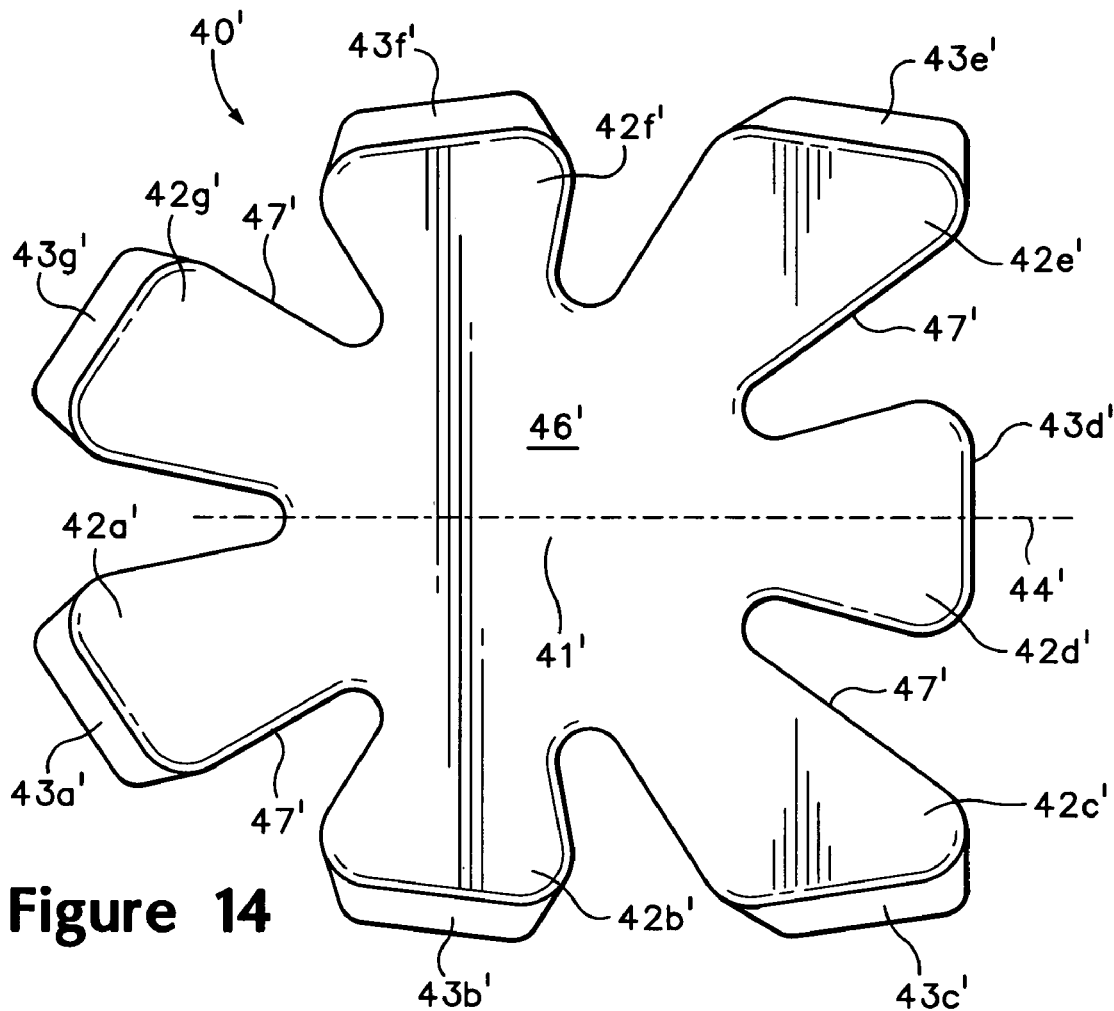
FIG. 14 is a bottom plan view of the second chamber.
Figure 15:
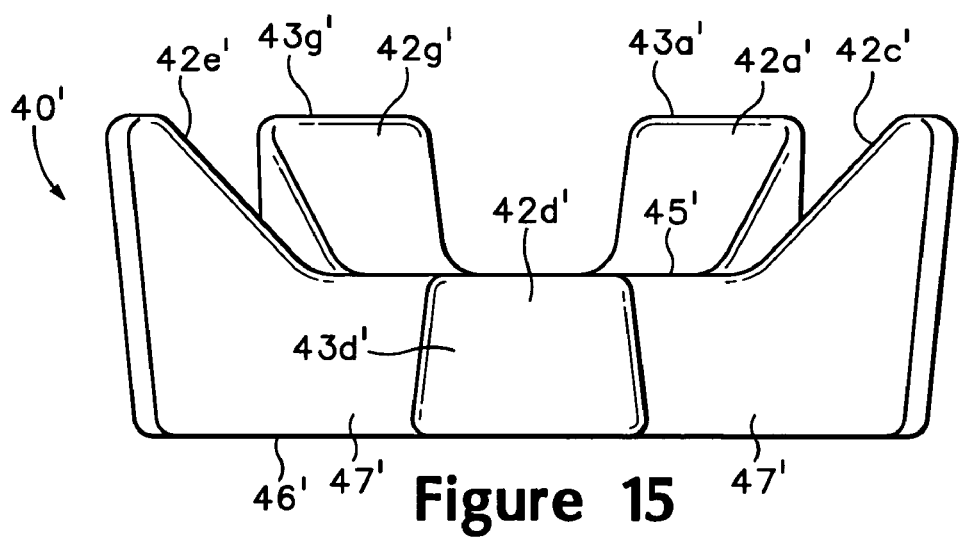
FIG. 15 is an elevational view of the second chamber.

The slope of sidewall 47', which is depicted in the cross-sectional views of FIGS. 13B-13D, varies around chamber 40' to provide a smooth transition during compression. Sidewall 47 slopes between adjacent lobes 42*a'*-42*g'* and has a substantially vertical slope at distal ends 43*a'*-43*e'*. The spaces between adjacent lobes 42*a'*-42*g'* have a generally U-shaped configuration, which is created by a curved surface of sidewall 47'. The portion of sidewall 47' positioned between adjacent lobes 42*a'*-42*g'* has a slope that is greater in areas adjacent to distal ends 43*a'*-43*g'* than in areas adjacent to central area 41'. More specifically, sidewall 47' has a relatively shallow slope adjacent to central area 41', which corresponds with the rounded portion of the U-shaped configuration. As sidewall 47' extends between central area 41' and distal ends 43*a'*-43*e'*, the slope increases. At distal ends 43*a'*-43*e'*, however, the slope of sidewall 47' is substantially vertical.

The typical motion of the foot during running proceeds as follows: First, the heel strikes the ground, followed by the ball of the foot. As the heel leaves the ground, the foot rolls forward so that the toes make contact, and finally the entire foot leaves the ground to begin another cycle. During the time that the foot is in contact with the ground and rolling forward, it also rolls from the outside or lateral side to the inside or medial side, a process called pronation. While the foot is air borne and preparing for another cycle the opposite process, called supination, occurs. Chamber 40 complements the motion of the foot during running by providing central area 41 with greater compliance than areas corresponding with lobes 42*a*-42*e*, thereby resisting rolling of the foot toward the medial side. In further embodiments, the size of lobes 42*a*-42*e* and the properties or quantity of the foam material may be altered to limit pronation. Similar concepts also apply to chamber 40'.

As with chamber 40, chamber 40' and its arrangement in the foam material of midsole 31' produces a relatively large deflection for a given load during initial stages of compression when compared to the fluid-filled chambers discussed in the Background of the Invention section. As the compression of chamber 40' increases, however, the stiffness of chamber 40' increases in a corresponding manner due to the structure of midsole 31. This effect is also the result of pressure ramping, the properties of the foam material in midsole 31', and film tensioning. Accordingly, the volume of chamber 40', the number and shape of lobes 42*a'*-42*g'*, the slope of sidewall 47', the thickness of surfaces 45' and 46', the material utilized to form the exterior of chamber 40', and the position and orientation of chamber 40' within midsole 31' may be varied to modify the cushioning response. In addition, the properties of the foam material, including the amount of foam material and the hardness and thickness, may also be adjusted to modify the cushioning response. By varying these and other parameters, therefore, midsole 31' may be custom tailored to a specific individual or to provide a specific cushioning response during compression.

One structural difference between chamber 40 and chamber 40' relates to the curved configuration of first surface 45'. With the curved configuration, the effect that film tensioning has upon the cushioning response occurs more rapidly during compression due to the downward angle of first surface 45'. That is, for a given degree of deflection in chamber 40', the effect of film tensioning will have a greater effect upon the cushioning characteristics when first surface 45' is curved. Furthermore, the curved configuration permits chamber 40' to have a fluid volume that is greater than the fluid volume of chamber 40, but with approximately the same stiffness.

Chamber 40 and chamber 40' were discussed in the above material to provide examples of the many chamber configurations that fall within the scope of the present invention. In general, an chamber will have a pair of opposite surface that form lobes in the chamber. Chamber 40 and chamber 40' were disclosed as having five and seven lobes, respectively. In other embodiments, however, the chambers may have any number of lobes ranging from three to twenty, for example.

Manufacturing Method

A method of manufacturing chamber 40' through a blow molding process will now be discussed with reference to FIGS. 16-25. In a conventional blow molding process for forming footwear chambers, a generally hollow and tubular structure of molten polymer material, otherwise referred to as a parison, is positioned between corresponding portions of a mold. The mold is then closed upon the parison such that a portion of the molten polymer material is drawn into the mold and conforms to the shape of the mold. Finally, the mold compresses opposite sides of the parison together and forms a bond between the opposite sides. In some blow molding process, however, an inlet remains open such that a pressurized fluid may be injected at a later stage of the manufacturing process, with the inlet being subsequently sealed.

The conventional blow molding process described above commonly utilizes a mold having two corresponding mold portions. Each mold portion has a generally planar surface and a recess that is formed in the surface, with the shape of the recess corresponding to one-half of the shape of the chamber. Accordingly, closing the mold portions forms a cavity within the mold with the shape of the chamber.

One consequence of the conventional mold structure is that the parison must stretch in order to extend into the recesses, and the stretching decreases the overall thickness of the parison wall. In order to counteract the effects of stretching, the parison is generally formed with an initial wall thickness that will stretch to the desired, lesser wall thickness. This manner of counteracting the effects of stretching is appropriate when the mold geometry is such that the parison stretches in a generally uniform manner. When the mold geometry is such that the blow-up ratio of some portions of the parison stretch is more than the blow-up ratio of other portions, however, merely increasing the wall thickness of the parison may not be appropriate due the resulting variance in the wall thickness of the chamber.

Conventional mold portions with generally planar surfaces and recesses that form a cavity with the shape of chamber 40' would generally be of the type that would cause specific portions of the parison to stretch substantially more than other portions. For example, the portion of the parison forming the area of chamber 40' where distal ends 43*a'*-43*g'* join with first surface 45' would stretch substantially more than the portion of the parison forming central area 41'. Accordingly, the thickness of chamber 40' at the junction of distal ends 43*a'*-43*g'* and first surface 45' would be substantially less than the thickness of chamber 40' at central area 41'. The method of manufacturing chamber 40', however, which is described below, provides a blow molding process that forms each of first surface 45', second surface 46', and sidewall 47' to have a substantially uniform thickness.

Another consequence of the conventional mold structure is that a parting line is formed in a middle of a sidewall of the resulting chamber. As discussed above, the mold compresses opposite sides of the parison together and forms a bond between the opposite sides. The bond represents the parting line and corresponds with the area where the opposite mold portions meet. In some footwear applications, the sidewall of the chamber is visible. A parting line positioned in a middle of the sidewall would, therefore, detract from the aesthetic properties of the chamber. The method of manufacturing chamber 40', however, provides a blow molding process that positions the parting line away from the middle of sidewall 47', and particularly from areas corresponding with distal ends 43*a'*-43*g'*.

Figure 16:
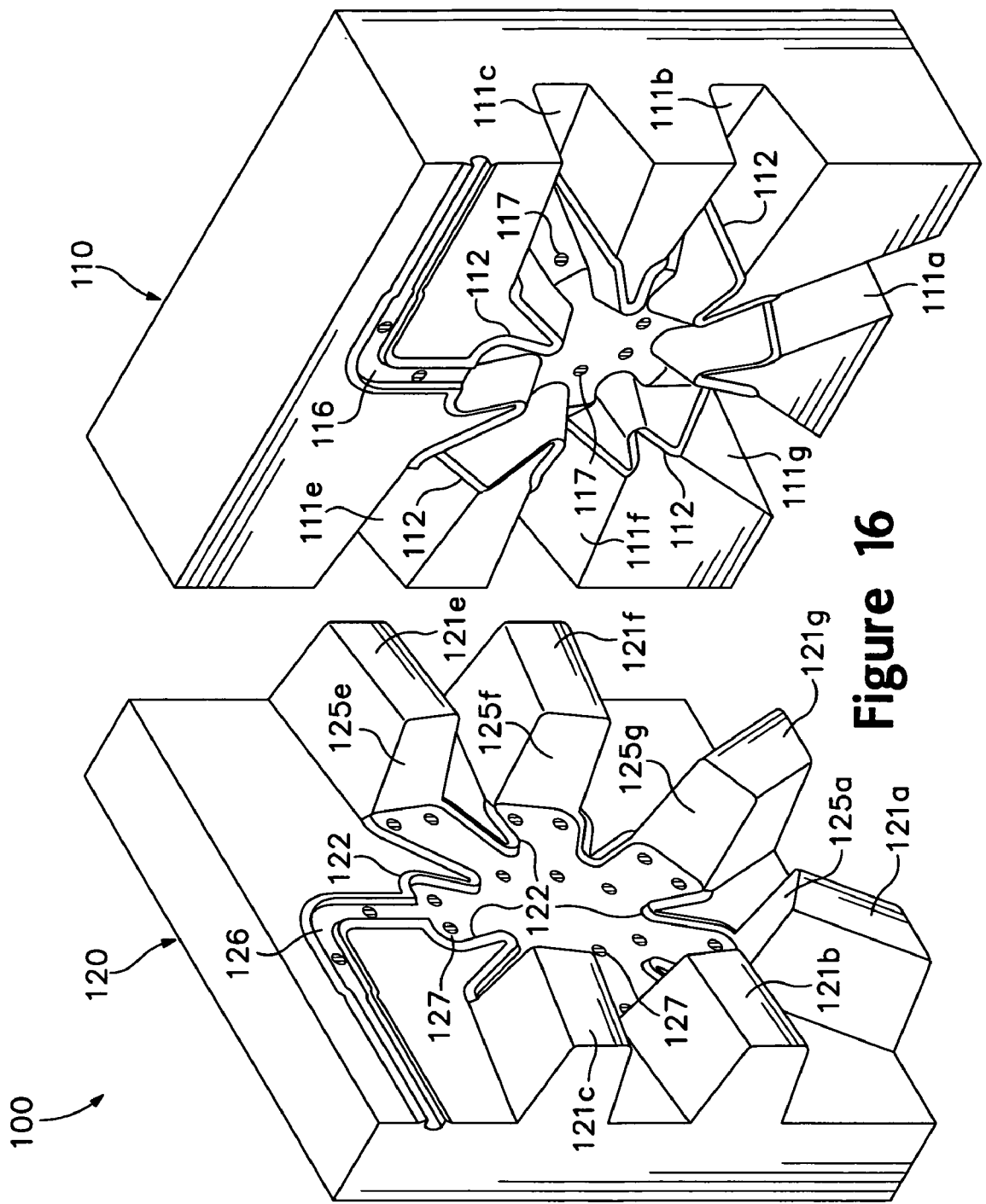
FIG. 16 is a perspective view of a mold for forming the second chamber.
Figure 17:
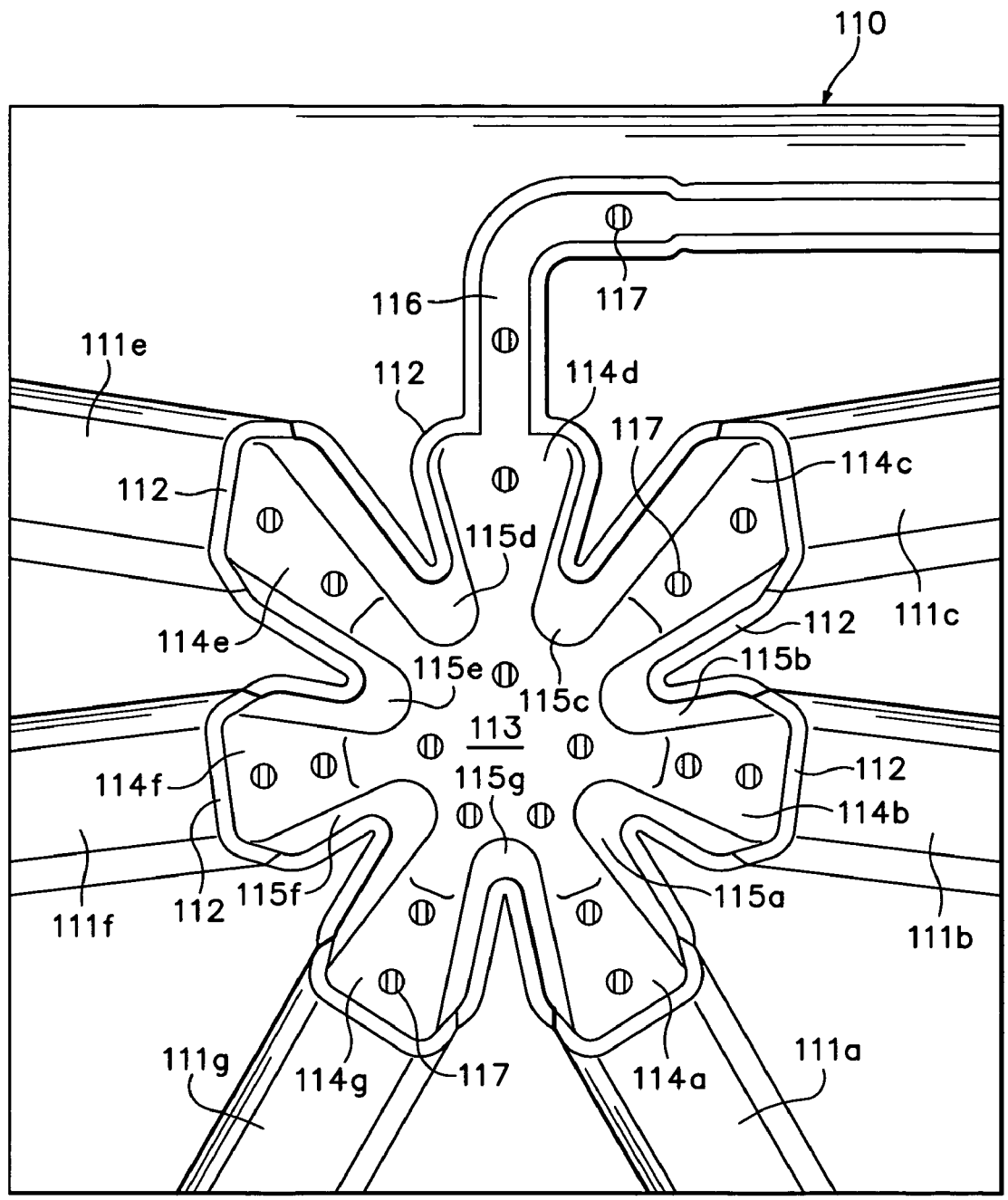
FIG. 17 is a plan view of a first portion of the mold.
Figure 18:
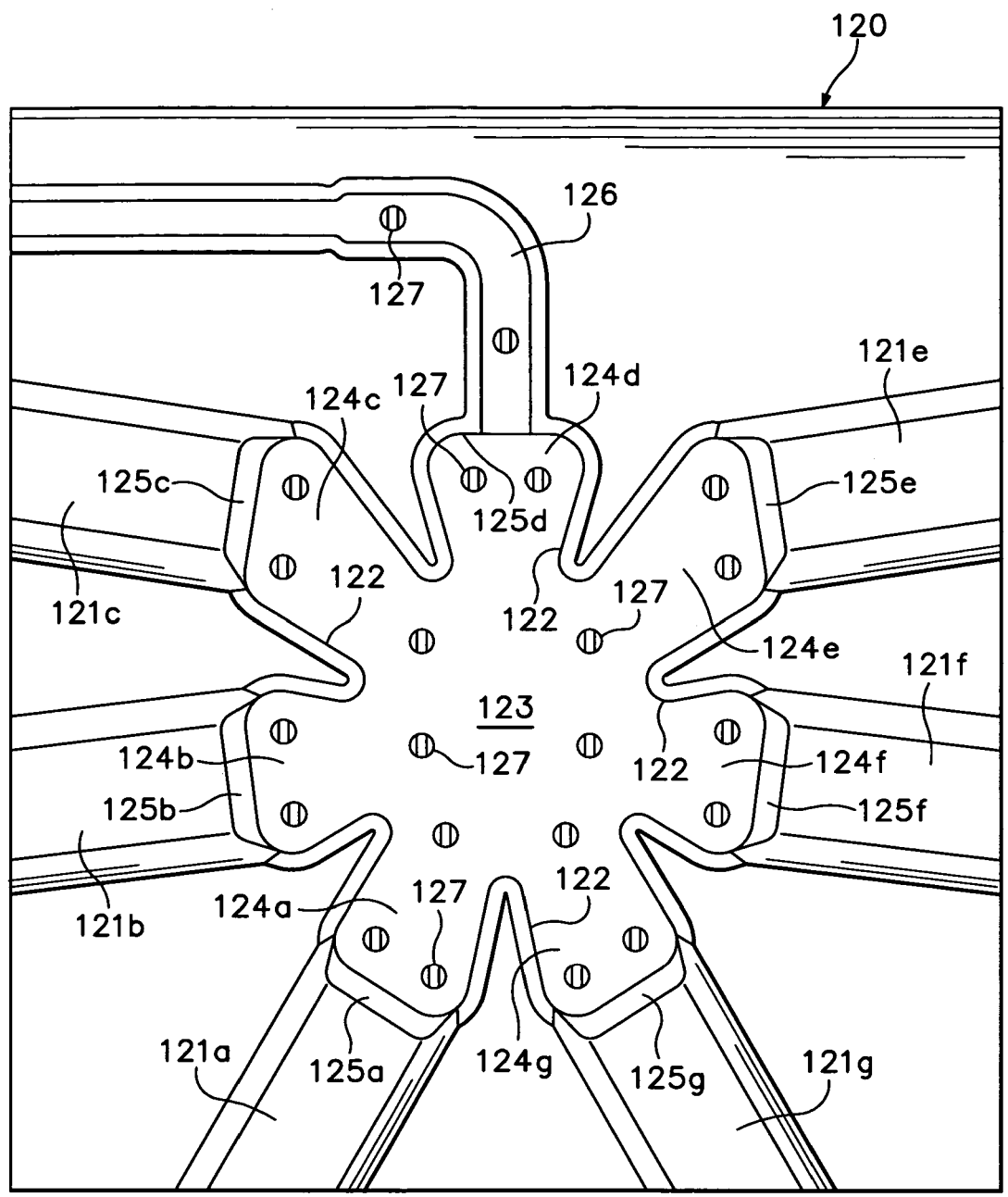
FIG. 18 is a plan view of a second portion of the mold.

A mold 100 that may be utilized to form chamber 40' is depicted in FIGS. 16-18. Mold 100 includes a first mold portion 110 and a corresponding second mold portion 120. When joined together, mold portions 110 and 120 form a cavity having dimensions substantially equal to the exterior dimensions of chamber 40'. Unlike the conventional mold for forming footwear chambers through a blow molding process, mold portions 110 and 120 do not have generally planar surfaces adjacent to the cavity that forms chamber 40'. Instead, first mold portion 110 defines a plurality of indentations 111*a-c* and 111*e-g*, and second mold portion 120 defines a plurality of protrusions 121*a-c* and 121*e-g*, as depicted in FIG. 16.

First mold portion 110 is depicted individually in FIG. 17 and forms the portions of chamber 40' corresponding with first surface 45' and the areas of sidewall 47' positioned adjacent to central area 41'. First mold portion 110 also forms that area of sidewall 47' corresponding with distal end 43*d'*. A ridge 112 extends around a centrally-located area of first mold portion 110. As will be discussed in greater detail below, ridge 112 is partially responsible for forming a parting line in chamber 40'. Accordingly, the area of first mold portion 110 located within the area bounded by ridge 112 forms first surface 45' and portions of sidewall 47'. More specifically, the surface of first mold portion 110 generally located proximal to a central area 113 forms central area 41', surfaces generally located around a plurality of lobe areas 114*a*-114*g* form the portions of lobes 42*a'*-42*g'* on first surface 45', and surfaces generally located around sidewall areas 115*a*-115*g* form the portions of sidewall 47' positioned adjacent to central area 41'.

The portions of first surface 45' adjacent to distal ends 43*a'*-43*c'* and 43*e'*-43*g'* curve upward to form a rounded or concave structure, as discussed with reference to chamber 40'. In order to form this configuration, the area of first mold portion 110 located within the area bounded by ridge 112 has a corresponding convex configuration. Accordingly, the surface of first mold portion 110 has a curved configuration from central area 113 to sidewall areas 114*a-c* and 114*e-g*.

An extension of ridge 112 extends outward from sidewall area 114*d* and forms an L-shaped channel 116. As discussed in greater detail below, channel 116 is utilized to form a conduit through which a fluid may be injected into chamber 40'. Another feature of first mold portion 110 is a plurality of slot vents 117 distributed throughout central area 113 and sidewall areas 114*a*-114*g*. Slot vents 117 provide outlets for air as a parison is drawn into first mold portion 110 during the formation of chamber 40'.

Second mold portion 120 is depicted individually in FIG. 18 and forms the portions of chamber 40' corresponding with second surface 46' and the areas of sidewall 47' corresponding with distal ends 43*a'*-43*c'* and 43*e'*-43*g'*. A ridge 122 extends around a centrally-located area of second mold portion 120, and ridge 122 cooperatively forms the parting line in chamber 40' with ridge 112. When first mold portion 110 is joined with second mold portion 120, therefore, ridge 112 is positioned immediately adjacent to ridge 122. The area of second mold portion 120 located within the area bounded by ridge 122 forms second surface 46' and the areas of sidewall 47' corresponding with distal ends 43*a'*-43*c'* and 43*e'*-43*g'*. More specifically, the surface of second mold portion 120 generally located proximal to a central area 123 forms central area 41', surfaces generally located around a plurality of lobe areas 124*a*-124*g* form the portions of lobes 42*a'*-42*g'* on second surface 46', and surfaces generally located around distal areas 125*a-c* and 125*e-g* form the portions of sidewall 47' corresponding with distal ends 43*a'*-43*c'* and 43*e'*-43*g'*.

With reference to chamber 40', second surface 46' has a generally planar configuration. The area of second mold portion 120 corresponding with central area 123 and lobe areas 124*a*-124*g*, which forms second surface 46', also has a generally planar configuration. Distal areas 125*a-c* and 125*e-g* extend upward from lobe areas 124*a-c* and 124*e-g*, respectively, to provide a generally planar area for forming distal ends 43*a'*-43*c'* and 43*e'*-43*g'*. An extension of ridge 122 extends outward from lobe area 124*d* and forms an L-shaped channel 126. In combination with channel 116, a conduit is formed through which a fluid may be injected into chamber 40'. Second mold portion 120 also includes a plurality of slot vents 127, which are distributed throughout central area 123 and lobe areas 124*a*-124*g*. As with slot vents 117, slot vents 127 provide outlets for air as the parison is drawn into second mold portion 120 during the formation of chamber 40'.

Indentations 111*a-c* and 111*e-g* and protrusions 121*a-c* and 121*e-g* extend outward from the portions of mold portions 110 and 120 that form chamber 40'. More specifically, indentations 111*a-c* and 111*e-g* extend radially outward from lobe areas 114*a-c* and 114*e-g*, respectively. Similarly, protrusions 121*a-c* and 121*e-g* extend radially outward from lobe areas 124*a-c* and 124*e-g*, respectively. Accordingly, indentations 111*a-c* and 111*e-g* and protrusions 121*a-c* and 121*e-g* are generally aligned with the portions of mold 100 that form lobes 42*a'*-42*c'* and 42*e'*-42*g'*.

The manner in which mold 100 is utilized to form chamber 40' from a parison 130 will now be discussed. Parison 130 is a generally hollow and tubular structure of molten polymer material. As utilized herein, the term tubular is not limited to a cylindrical configuration, which has a circular cross-section, but is also intended to encompass configurations having an elongated or oblong cross-section. In forming parison 130, the molten polymer material is extruded from a die. The wall thickness of parison 130 may be substantially constant, or may vary around the perimeter of parison 130. Accordingly, a cross-sectional view of parison 130 may exhibit areas of differing wall thickness. Suitable materials for parison 130 include the materials discussed above with respect to chamber 40 and chamber 40'.

Figures 19, 20:
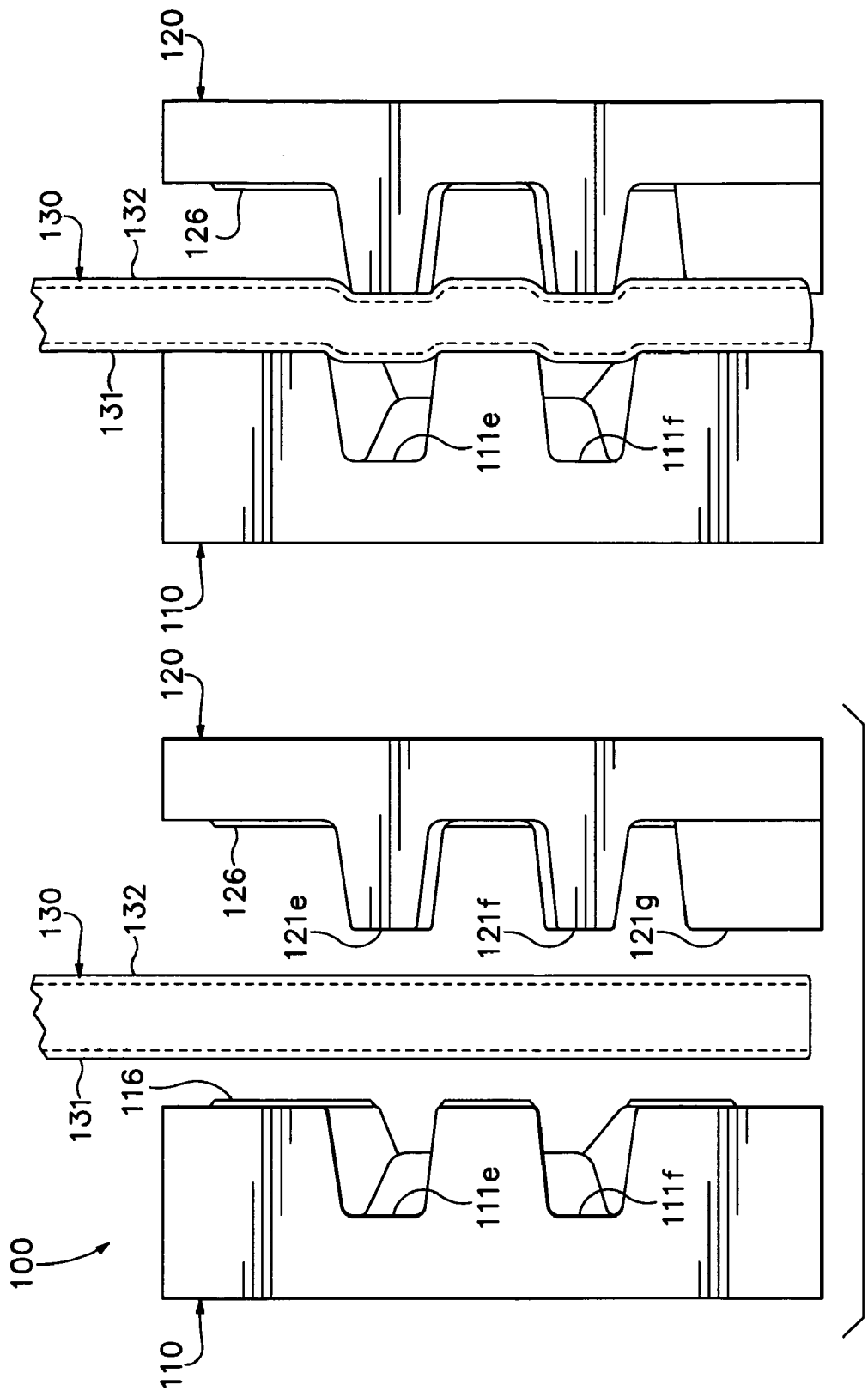
FIG. 19 is a side elevational view of a parison positioned between the first and second portions of the mold prior to molding.
FIG. 20 is a side elevational view of the parison positioned between the first and second portions of the mold during an intermediate portion of molding.

Following the formation of parison 130, as described above, parison 130 is suspended between mold portions 110 and 120, as depicted in FIG. 19. For purposes of discussion, parison 130 has a first side 131 that faces first mold portion 110, and parison 130 has a second side 132 that faces second mold portion 120. Mold portions 110 and 120 are then aligned such that indentations 111*a-c* and 111*e-g* correspond with protrusions 121*a-c* and 121*e-g*, respectively. In this position, the areas of mold portions 110 and 120 that form chamber 40' are positioned on opposite sides of parison 130 and are also aligned. Mold portions 110 and 120 then translate toward each other such that mold 100 contacts parison 130, as depicted in FIG. 20. More specifically, the surfaces of first mold portion 110 in which indentations 111*a-c* and 111*e-g* are formed contact first side 131, and the surfaces of second mold portion 120 that form protrusions 121*a-c* and 121*e-g* contact second side 132.

When mold 100 contacts parison 130, portions of parison 130 bend to accommodate further movement of mold portions 110 and 120 toward each other, which is also depicted in FIG. 20. In particular, first surface 131 bends into indentations 111*a-c* and 111*e-g*, and second surface 132 bends around protrusions 121*a-c* and 121*e-g*. Accordingly, parison 130 continues to bend as mold portions 110 and 120 continue to translate toward each other.

Figures 21, 22:
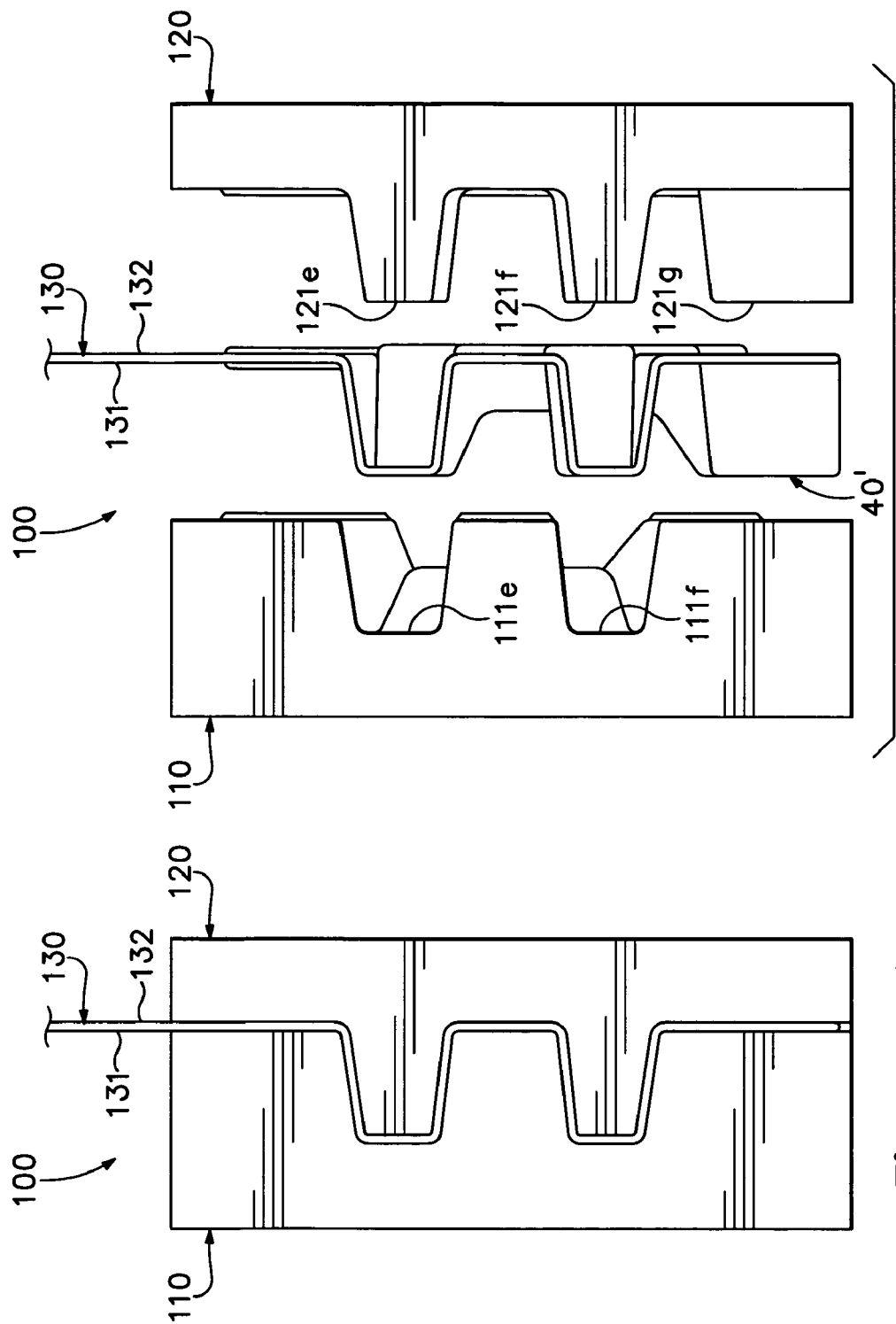
FIG. 21 is a side elevational view of the parison positioned between the first and second portions of the mold during another intermediate portion of molding.
FIG. 22 is a side elevational view of a parison positioned between the first and second portions of the mold following molding.

Upon further movement of mold portions 110 and 120 toward each other, protrusions 121*a-c* and 121*e-g* extend entirely into indentations 111*a-c* and 111*e-g* and side 131 of parison 130 is compressed against side 132 of parison 130, thereby bonding portions of side 131 to side 132, as depicted in FIG. 21. A central area of parison 130, however, contacts and conforms to the surfaces of mold 100 that are intended to form chamber 40'. Accordingly, a central area of first side 131 contacts and conforms to the contours of central area 113, lobe areas 114*a*-114*g*, and sidewall areas 115*a*-115*g*. Similarly, a central area of second side 132 contacts and conforms to the contours of central area 123, areas lobe 124*a*-124*g*, and distal areas 125a-c and 125e-g. Furthermore, ridges 112 and 122 compress sides 131 and 132 together, thereby forming a bond that seals peripheral areas of chamber 40'.

As mold 100 closes, a fluid, such as air, having a positive pressure in comparison with ambient air may be injected between sides 131 and 132 to induce parison 130 to contact and conform to the contours of mold portions 110 and 120. Initially, the fluid may be delivered from the die mechanism that forms parison 130 and may be directed along the longitudinal length of parison 130, thereby preventing sides 131 and 132 from contacting each other. Once mold 100 closes upon parison 130, however, the fluid may be directed through the conduit formed by channels 116 and 126. For example, a needle may puncture parison 130 at the entrance to the conduit and deliver a fluid that travels down the conduit and into the area forming chamber 40'. Air may also be removed from the area between parison 130 and mold portions 110 and 120 through slot vents 117 and 127, thereby drawing parison 130 onto the surface of mold portions 110 and 120.

Figure 23:
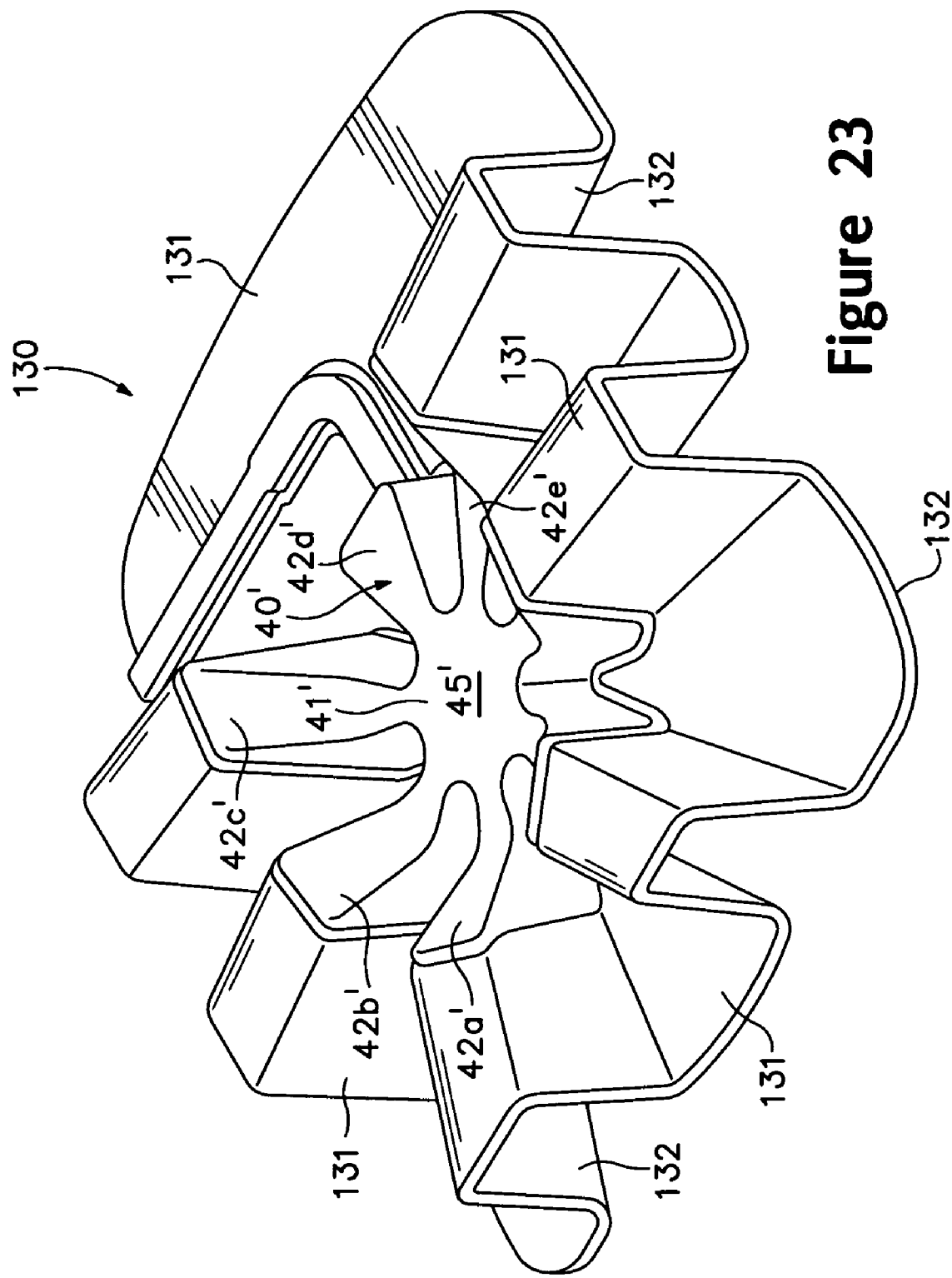
FIG. 23 is a first perspective view of the second chamber formed in the parison.
Figure 24:
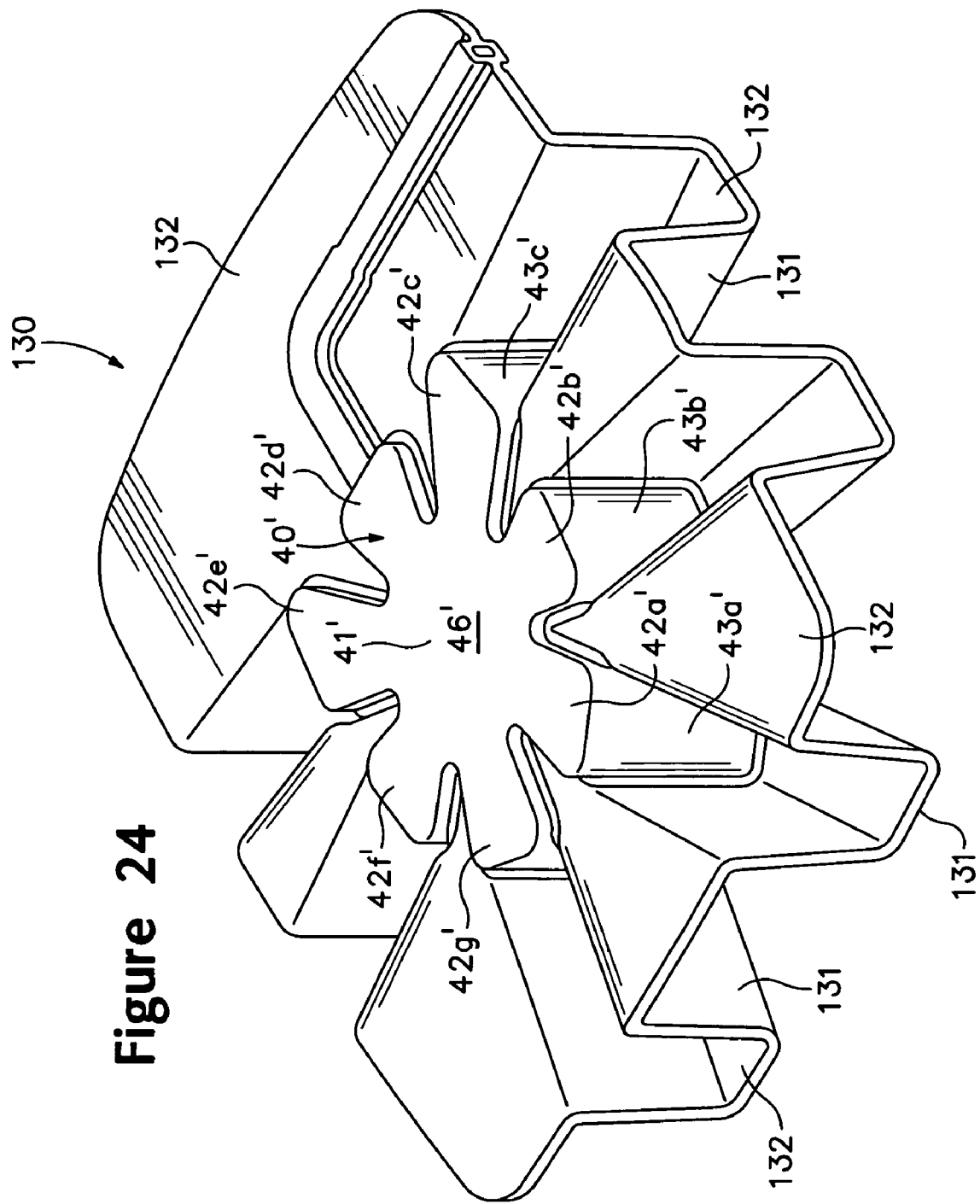
FIG. 24 is a second perspective view of the second chamber formed in the parison.
Figure 25:
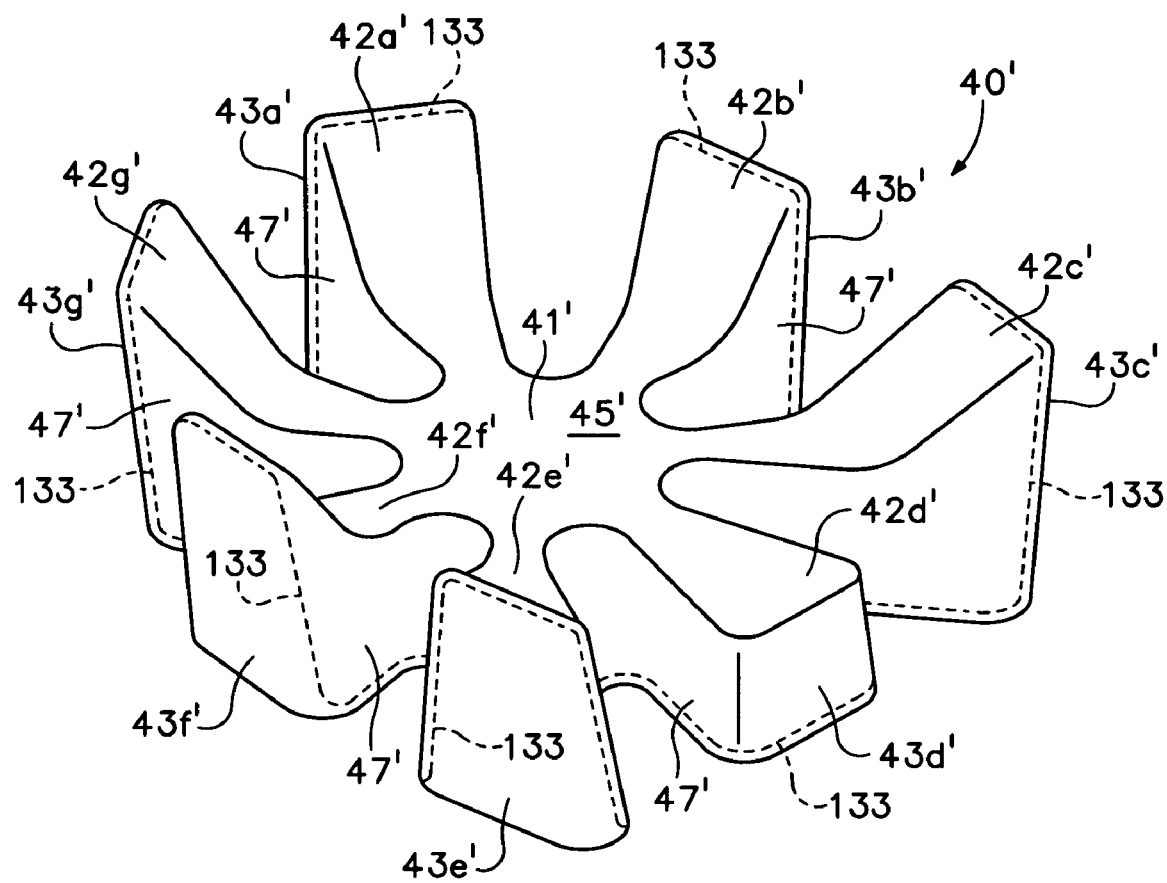
FIG. 25 is a perspective view of the second chamber that highlights a position of a parting line.

Once chamber 40' is formed within mold 100, mold portions 110 and 120 separate such that the parison may be removed from mold 100, as depicted in FIGS. 23-24. The polymer material forming parison 130 is then permitted to cool, and the conduit formed by channels 116 and 126 may be sealed to enclose the fluid within chamber 40' at ambient pressure. Alternately, a pressurized fluid may be injected through the conduit prior to sealing. In addition, excess portions of parison 130 may be trimmed or otherwise removed from chamber 40'. The excess portions may them be recycled or reutilized to form another parison.

Based upon the above discussion, mold portions 110 and 120 each generally include a bending zone and a forming zone that have different functions. With respect to first mold portion 110, the bending zone includes indentations 111a-c and 111e-g. The bending zone is responsible, therefore, for bending parison 130 prior to bonding. The forming zone includes central area 113, lobe areas 114a-114g, and sidewall areas 115a-115g. The forming zone is responsible, therefore, for imparting the actual shape of chamber 40' to the parison. That is, the forming zone actually forms first surface 45' and portions of sidewall 47' of chamber 40'. Similarly, bending zone of second mold portion 120 includes protrusions 121a-c and 121e-g and is also responsible for bending parison 130 prior to bonding. The forming zone of second mold portion 120 includes central area 123, lobe areas 124a-124g, and distal areas 125a-c and 125e-g, and the forming zone actually forms second surface 46' and other portions of sidewall 47'. Accordingly, mold portions 110 and 120 each include a bending zone that bends the parison and a forming zone that forms portions of chamber 47', the bending zone being separate from the forming zone.

Sides 131 and 132 bend when mold portions 110 and 120 initially contact parison 130, as discussed above. Some portions of parison 130 may stretch, however, in order to induce parison 130 to contact and conform to the various surfaces that form chamber 40'. The purpose of bending sides 131 and 132 when mold portions 110 and 120 initially contact parison 130 is to impart a uniformity to the stretching of parison 130. That is, the bending of parison 130 ensures that sides 131 and 132 stretch in a generally uniform manner, thereby imparting a largely uniform thickness to first surface 45', second surface 46', and sidewall 47' of chamber 40'.

Another advantage of bending sides 131 and 132 relates to a position of a parting line 133, which corresponds with the area where the opposite mold portions meet adjacent to bladder 40'. That is, parting line 133 is the bond in chamber 40' between side 131 and side 132 that is formed by ridges 112 and 122. Referring to FIG. 26, the position of parting line 133 is highlighted with a dashed line for purposes of reference. In many prior art chambers formed through a conventional blow molding process, the parting line extends horizontally across the sidewall in a linear manner and obscures portions of the sidewall. With regard to chamber 40', however, parting line 133 does not merely extend vertically across sidewall 47'. Instead, parting line 133 follows a non-linear course having a wave-like pattern that extends around distal ends 43a'-43g'. More specifically, parting line 133 extends horizontally between sidewall 47' and first surface 45' at upper ends of distal ends 43a'-43c' and 43e'-43g'. Parting line 133 then extends vertically across sidewall 47' and along the sides of distal ends 43a'-43c' and 43e'-43g'. Accordingly, at least a portion of parting line 133 extends between first surface 45' and second surface 46'. Parting line 133 also extends horizontally between sidewall 47' and second surface 46' in areas between lobes 42a'-42g'. When incorporated into an article of footwear, as depicted in FIG. 8, parting line 133 will generally not be visible, and parting line 133 will not extend across distal ends 43a'-43g', which are the visible portions of chamber 40'. Parting line 133 is, therefore, not centered in sidewall 47'.

One consequence of the non-linear parting line 133 is that specific areas of sidewall 47' are formed from either first side 131 or second side 132. For example, the areas of sidewall 47' that are adjacent to central area 41', which will be referred to as first areas herein, are formed by first side 131. Accordingly, the first area of sidewall 47' extends from first surface 45' to second surface 46' and is formed from first side 131. Similarly, the areas of sidewall 47' that form distal ends 43a'-43c' and 43e'-43g', which will be referred to as second areas herein, are formed from second side 132. Accordingly, the second area of sidewall 47' also extends from first surface 45' to second surface 46' and is formed from second side 132. In general, the first area and the second area alternate such that the first side and the second side are interlaced to form sidewall 47'.

The blow molding method described above departs from the conventional blow molding process for footwear chambers. For example, mold 100 includes the plurality of indentations 111a-c and 111e-g and the plurality of protrusions 121a-c and 121e-g to bend parison 130 prior to bonding or stretching, thereby inducing uniformity in the wall thickness of chamber 40'. In addition, the bending of parison 130 forms a non-centered parting line 133 that does not extend across visible portions of sidewall 47'.

Conclusion

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of footwear having an upper and a sole structure secured to the upper, the sole structure comprising:
   a chamber having a first surface and an opposite second surface peripherally-joined to enclose a fluid, the first surface and the second surface being devoid of internal connections that secure interior portions of the first surface to interior portions of the second surface, the first surface and the second surface defining a plurality of lobes extending outward from a central area of the chamber, the lobes being in fluid communication with the central area, and the lobes defining spaces positioned between the lobes located adjacent to each other; and a polymer foam material extending adjacent to and contacting at least one of the first surface and the second surface, and the polymer foam material extending into the spaces positioned between the lobes, wherein at least a portion of the lobes extend to a side surface of the sole structure and are exposed at the side surface.

2. The article of footwear recited in claim 1, wherein a pressure of the fluid is in a range of zero to five pounds per square inch.

3. The article of footwear recited in claim 1, wherein the fluid is air.

4. The article of footwear recited in claim 1, wherein the first surface and the second surface have a substantially planar configuration.

5. The article of footwear recited in claim 1, wherein at least one of the first surface and the second surface has a curved configuration.

6. The article of footwear recited in claim 1, wherein the chamber is symmetrical about a plane extending through the chamber.

7. The article of footwear recited in claim 1, wherein the chamber includes at least five of the lobes.

8. The article of footwear recited in claim 1, wherein the chamber is positioned in a heel area of the sole structure and adjacent to a lower surface of the polymer foam material.

9. The article of footwear recited in claim 1, wherein the lobes extend radially outward from the central area.

10. An article of footwear having an upper and a sole structure secured to the upper, the sole structure comprising:

a chamber having a first surface and an opposite second surface peripherally-joined to enclose a fluid, the first surface and the second surface defining a plurality of lobes extending outward from a central area of the chamber, the lobes being in fluid communication with the central area, and the lobes defining spaces positioned between the lobes located adjacent to each other; and a polymer foam material having a surface that defines a concave area with a shape of at least a portion of the chamber, the chamber being positioned within the concave area such that one of the first surface and the second surface of the chamber are substantially co-planar with the surface of the polymer foam material, wherein at least a portion of the lobes extend to a side surface of the sole structure and are exposed at the side surface.

11. The article of footwear recited in claim 10, wherein the polymer foam material extends into the spaces positioned between the lobes.

12. The article of footwear recited in claim 10, wherein the first surface and the second surface of the chamber are devoid of internal connections that secure interior portions of the first surface to interior portions of the second surface.

13. The article of footwear recited in claim 10, wherein the fluid is air and a pressure of the fluid is in a range of zero to five pounds per square inch.

14. The article of footwear recited in claim 10, wherein the first surface and the second surface have a substantially planar configuration.

15. The article of footwear recited in claim 10, wherein at least one of the first surface and the second surface has a curved configuration.

16. The article of footwear recited in claim 10, wherein the chamber is symmetrical about a plane extending through the chamber.

17. The article of footwear recited in claim 10, wherein the chamber includes at least five of the lobes, and the lobes extend radially outward from the central area.

18. The article of footwear recited in claim 10, wherein the chamber is positioned in a heel area of the sole structure.

19. An article of footwear having an upper and a sole structure secured to the upper, the sole structure comprising:

a fluid-filled chamber defining a plurality of lobes extending outward from a central area of the chamber, the lobes being in fluid communication with the central area, and the lobes defining spaces positioned between the lobes located adjacent to each other; and a polymer foam material extending around at least a portion of the chamber, the polymer foam material extending into the spaces positioned between the lobes, wherein at least a portion of the lobes extend to a side surface of the polymer foam material and are exposed at the side surface.

20. The article of footwear recited in claim 19, wherein a pressure within the chamber is in a range of zero to five pounds per square inch.

21. The article of footwear recited in claim 19, wherein the chamber defines a first surface and an opposite second surface, at least one of the first surface and the second surface has a substantially planar configuration.

22. The article of footwear recited in claim 21, wherein at least one of the first surface and the second surface has a curved configuration.

23. The article of footwear recited in claim 19, wherein the chamber is symmetrical about a plane extending through the chamber.

24. The article of footwear recited in claim 19, wherein the chamber includes at least five of the lobes.

25. The article of footwear recited in claim 19, wherein the chamber is positioned in a heel area of the sole structure and adjacent to a lower surface of the polymer foam material.

26. The article of footwear recited in claim 19, wherein the lobes extend radially outward from the central area.

* * * * *